US010115263B2

(12) United States Patent
Nguyen et al.

(10) Patent No.: US 10,115,263 B2
(45) **Date of Patent: *Oct. 30, 2018**

(54) ADAPTIVE MOBILE DEVICE GAMING SYSTEM

(71) Applicant: Nguyen Gaming LLC, Reno, NV (US)

(72) Inventors: Binh T. Nguyen, Reno, NV (US); C. Douglass Thomas, Saratoga, CA (US)

(73) Assignee: Nguyen Gaming LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,291

(22) Filed: Feb. 8, 2017

(65) Prior Publication Data

US 2017/0148261 A1 May 25, 2017

Related U.S. Application Data

(63) Continuation of application No. 14/211,536, filed on Mar. 14, 2014, now Pat. No. 9,600,976.

(Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ...... *G07F 17/3237* (2013.01); *G07F 17/3218* (2013.01); *G07F 17/3288* (2013.01)

(58) Field of Classification Search

CPC ........................................................ G07F 17/32

See application file for complete search history.

(56) References Cited

U.S. PATENT DOCUMENTS

| | | | |
|---|---|---|---|
| 2,033,638 | A | 3/1936 | Koppl |
| 2,062,923 | A | 12/1936 | Nagy |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Benston, Liz, "Harrahs Launches iPhone App; Caesars Bypasses Check-in," Las Vegas Sun, Las Vegas, NV. Jan. 8, 2010.

(Continued)

*Primary Examiner* — Kevin Y Kim

(57) ABSTRACT

Embodiments disclosed herein concern mobile gaming environments. Portable electronic devices can be supported by the mobile gaming environments. The locations of the portable electronic device can influence how the portable electronic devices operate or what services or features are available to the portable electronic device or their users. According to one embodiment, a mobile gaming system can concern gaming/betting opportunities that can be secured using a portable electronic device even when an individual is located in a location where betting or games of chance are not permitted. According to another embodiment, a mobile gaming system can concern an application program operating on a portable electronic device that supports multiple modes of operation depending upon whether the portable electronic device is in a location where betting or games of chance are permitted.

25 Claims, 9 Drawing Sheets

Related U.S. Application Data

(60) Provisional application No. 61/873,300, filed on Sep. 3, 2013, provisional application No. 61/799,862, filed on Mar. 15, 2013.

(56) References Cited

U.S. PATENT DOCUMENTS 4,741,539 A 5/1988 Sutton et al.
4,948,138 A 8/1990 Pease et al.
5,067,712 A 11/1991 Georgilas
5,429,361 A 7/1995 Raven et al.
5,489,103 A 2/1996 Okamoto
5,630,757 A 5/1997 Gagin
5,655,961 A 8/1997 Acres et al.
5,704,835 A 1/1998 Dietz, II
5,727,786 A 3/1998 Weingardt
5,833,537 A 11/1998 Barrie
5,842,921 A 12/1998 Mindes
5,919,091 A 7/1999 Bell et al.
5,947,820 A 9/1999 Morro et al.
5,997,401 A 12/1999 Crawford
6,001,016 A 12/1999 Walker et al.
6,039,648 A 3/2000 Guinn et al.
6,059,289 A 5/2000 Vancura
6,089,977 A 7/2000 Bennett
6,095,920 A 8/2000 Sudahiro
6,110,041 A 8/2000 Walker et al.
6,142,872 A 11/2000 Walker et al.
6,146,273 A 11/2000 Olsen
6,165,071 A 12/2000 Weiss
6,231,445 B1 5/2001 Acres
6,270,412 B1 8/2001 Crawford et al.
6,290,600 B1 9/2001 Glasson
6,293,866 B1 9/2001 Walker et al.
6,353,390 B1 3/2002 Beri et al.
6,364,768 B1 4/2002 Acres et al.
6,404,884 B1 6/2002 Marwell et al.
6,416,406 B1 7/2002 Duhamel
6,416,409 B1 7/2002 Jordan
6,443,452 B1 9/2002 Brune
6,491,584 B2 12/2002 Graham et al.
6,505,095 B1 1/2003 Kolls
6,508,710 B1 1/2003 Paravia et al.
6,561,900 B1 5/2003 Baerlocker et al.
6,592,457 B1 7/2003 Frohm et al.
6,612,574 B1 9/2003 Cole et al.
6,620,046 B2 9/2003 Rowe
6,641,477 B1 11/2003 Dietz, II
6,645,078 B1 11/2003 Mattice
6,719,630 B1 4/2004 Seelig et al.
6,749,510 B2 6/2004 Globbi
6,758,757 B2 7/2004 Luciano, Jr. et al.
6,773,345 B2 8/2004 Walker et al.
6,778,820 B2 8/2004 Tendler
6,780,111 B2 8/2004 Cannon et al.
6,799,032 B2 9/2004 McDonnell et al.
6,800,027 B2 10/2004 Giobbi et al.
6,804,763 B1 10/2004 Stockdale et al.
6,811,486 B1 11/2004 Luciano, Jr.
6,843,725 B2 1/2005 Nelson
6,846,238 B2 1/2005 Wells
6,848,995 B1 2/2005 Walker et al.
6,852,029 B2 2/2005 Baltz et al.
6,869,361 B2 3/2005 Sharpless et al.
6,875,106 B2 4/2005 Weiss et al.
6,884,170 B2 4/2005 Rowe
6,884,172 B1 4/2005 Lloyd et al.
6,902,484 B2 6/2005 Idaka
6,908,390 B2 6/2005 Nguyen et al.
6,913,532 B2 7/2005 Bearlocher et al.
6,923,721 B2 8/2005 Luciano et al.
6,935,958 B2 8/2005 Nelson
6,949,022 B1 9/2005 Showers
6,955,600 B2 10/2005 Glavich et al.
6,971,956 B2 12/2005 Rowe et al.
6,984,174 B2 1/2006 Cannon et al.
6,997,803 B2 2/2006 LeMay et al.
7,018,292 B2 3/2006 Tracy et al.
7,032,115 B2 4/2006 Kashani
7,033,276 B2 4/2006 Walker et al.
7,035,626 B1 4/2006 Luciano
7,037,195 B2 5/2006 Schneider et al.
7,048,628 B2 5/2006 Schneider
7,048,630 B2 5/2006 Berg et al.
7,063,617 B2 6/2006 Brosnan et al.
7,076,329 B1 7/2006 Kolls
7,089,264 B1 8/2006 Guido et al.
7,094,148 B2 8/2006 Bearlocher et al.
7,105,736 B2 9/2006 Laakso
7,111,141 B2 9/2006 Nelson
7,144,321 B2 12/2006 Mayeroff
7,152,783 B2 12/2006 Chaffin
7,169,041 B2 1/2007 Tessmer et al.
7,169,052 B2 1/2007 Beaulieu et al.
7,175,523 B2 2/2007 Gilmore et al.
7,181,228 B2 2/2007 Boesch
7,182,690 B2 2/2007 Giobbi et al.
RE39,644 E 5/2007 Alcorn et al.
7,243,104 B2 7/2007 Bill
7,247,098 B1 7/2007 Bradford et al.
7,259,718 B2 8/2007 Patterson et al.
7,275,989 B2 10/2007 Moody
7,285,047 B2 10/2007 Gielb et al.
7,311,608 B1 12/2007 Danieli
7,314,408 B2 1/2008 Cannon et al.
7,316,615 B2 1/2008 Soltys et al.
7,316,619 B2 1/2008 Nelson
7,318,775 B2 1/2008 Brosnan et al.
7,326,116 B2 2/2008 O'Donovan et al.
7,330,108 B2 2/2008 Thomas
7,346,358 B2 3/2008 Wood et al.
7,355,112 B2 4/2008 Laakso
7,384,338 B2 6/2008 Rothschild et al.
7,387,571 B2 6/2008 Walker et al.
7,393,278 B2 7/2008 Gerson et al.
7,396,990 B2 7/2008 Lu et al.
7,415,426 B2 8/2008 Williams et al.
7,425,177 B2 9/2008 Rodgers et al.
7,427,234 B2 9/2008 Soltys et al.
7,427,236 B2 9/2008 Kaminkow et al.
7,427,708 B2 9/2008 Ohmura
7,431,650 B2 10/2008 Kessman
7,448,949 B2 11/2008 Kaminkow et al.
7,500,913 B2 3/2009 Baerlocher
7,510,474 B2 3/2009 Carter
7,513,828 B2 4/2009 Nguyen et al.
7,519,838 B1 4/2009 Suurballe
7,559,838 B2 7/2009 Walker et al.
7,563,167 B2 7/2009 Walker et al.
7,572,183 B2 8/2009 Olivas et al.
7,585,222 B2 9/2009 Muir
7,602,298 B2 10/2009 Thomas
7,607,174 B1 10/2009 Kashchenko et al.
7,611,409 B2 11/2009 Muir et al.
7,637,810 B2 12/2009 Amaitis et al.
7,644,861 B2 1/2010 Alderucci et al.
7,653,757 B1 1/2010 Fernald et al.
7,693,306 B2 4/2010 Huber
7,699,703 B2 4/2010 Muir et al.
7,722,453 B2 5/2010 Lark et al.
7,758,423 B2 7/2010 Foster et al.
7,771,271 B2 8/2010 Walker et al.
7,780,529 B2 8/2010 Rowe et al.
7,780,531 B2 8/2010 Englman et al.
7,785,192 B2 8/2010 Canterbury et al.
7,811,172 B2 10/2010 Asher et al.
7,819,749 B1 10/2010 Fish
7,822,688 B2 10/2010 Labron
7,828,652 B2 11/2010 Nguyen et al.
7,828,654 B2 11/2010 Carter
7,828,661 B1 11/2010 Fish
7,850,528 B2 12/2010 Wells
7,874,919 B2 1/2011 Paulsen et al.
7,877,798 B2 1/2011 Saunders et al.

(56) References Cited

U.S. PATENT DOCUMENTS

| | | | |
|---|---|---|---|
| 7,883,413 | B2 | 2/2011 | Paulsen |
| 7,892,097 | B2 | 2/2011 | Muir et al. |
| 7,909,692 | B2 | 3/2011 | Nguyen et al. |
| 7,909,699 | B2 | 3/2011 | Parrott et al. |
| 7,918,728 | B2 | 4/2011 | Nguyen et al. |
| 7,927,211 | B2 | 4/2011 | Rowe et al. |
| 7,927,212 | B2 | 4/2011 | Hedrick et al. |
| 7,951,008 | B2 | 5/2011 | Wolf et al. |
| 8,057,298 | B2 | 11/2011 | Nguyen et al. |
| 8,057,303 | B2 | 11/2011 | Rasmussen |
| 8,087,988 | B2 | 1/2012 | Nguyen et al. |
| 8,117,608 | B1 | 2/2012 | Slettehaugh |
| 8,133,113 | B2 | 3/2012 | Nguyen |
| 8,182,326 | B2 | 5/2012 | Speers et al. |
| 8,210,927 | B2 | 7/2012 | Hedrick |
| 8,221,245 | B2 | 7/2012 | Walker |
| 8,226,459 | B2 | 7/2012 | Barrett |
| 8,226,474 | B2 | 7/2012 | Nguyen et al. |
| 8,231,456 | B2 | 7/2012 | Zielinski |
| 8,235,803 | B2 | 8/2012 | Loose et al. |
| 8,282,475 | B2 | 10/2012 | Nguyen et al. |
| 8,323,099 | B2 | 12/2012 | Durham et al. |
| 8,337,290 | B2 | 12/2012 | Nguyen et al. |
| 8,342,946 | B2 | 1/2013 | Amaitis |
| 8,393,948 | B2 | 3/2013 | Allen et al. |
| 8,403,758 | B2 | 3/2013 | Homik |
| 8,430,745 | B2 | 4/2013 | Agarwal et al. |
| 8,461,958 | B2 | 6/2013 | Saenz |
| 8,469,813 | B2 | 6/2013 | Joshi |
| 8,529,345 | B2 | 9/2013 | Nguyen |
| 8,602,875 | B2 | 12/2013 | Nguyen |
| 8,613,655 | B2 | 12/2013 | Kisenwether |
| 8,613,659 | B2 | 12/2013 | Nelson et al. |
| 8,696,470 | B2 | 4/2014 | Nguyen |
| 8,745,417 | B2 | 6/2014 | Huang et al. |
| 8,858,323 | B2 | 10/2014 | Nguyen et al. |
| 8,864,586 | B2 | 10/2014 | Nguyen |
| 8,942,995 | B1 | 1/2015 | Kerr |
| 9,039,507 | B2 | 5/2015 | Allen et al. |
| 9,235,952 | B2 | 1/2016 | Nguyen |
| 9,292,996 | B2 | 3/2016 | Davis et al. |
| 9,325,203 | B2 | 4/2016 | Nguyen |
| 9,466,171 | B2 | 10/2016 | Hornik |
| 9,483,901 | B2 | 11/2016 | Nguyen |
| 9,486,697 | B2 | 11/2016 | Chung |
| 9,486,704 | B2 | 11/2016 | Chung |
| 9,576,425 | B2 | 2/2017 | Nguyen |
| 9,626,826 | B2 | 4/2017 | Nguyen |
| 9,666,021 | B2 | 5/2017 | Nguyen |
| 9,672,686 | B2 | 6/2017 | Nguyen |
| 9,741,205 | B2 | 8/2017 | Nguyen |
| 9,811,973 | B2 | 11/2017 | Nguyen |
| 9,814,970 | B2 | 11/2017 | Nguyen |
| 9,842,462 | B2 | 12/2017 | Nguyen |
| 9,875,606 | B2 | 1/2018 | Nguyen |
| 9,875,609 | B2 | 1/2018 | Nguyen |
| 2001/0004607 | A1 | 6/2001 | Olsen |
| 2001/0016516 | A1 | 8/2001 | Takatsuka |
| 2001/0024971 | A1 | 9/2001 | Brossard |
| 2001/0047291 | A1 | 11/2001 | Garahi |
| 2002/0006822 | A1 | 1/2002 | Krintzman |
| 2002/0042295 | A1 | 4/2002 | Walker et al. |
| 2002/0111210 | A1 | 8/2002 | Luciano, Jr. et al. |
| 2002/0111213 | A1 | 8/2002 | McEntee et al. |
| 2002/0113369 | A1 | 8/2002 | Weingardt |
| 2002/0116615 | A1 | 8/2002 | Nguyen et al. |
| 2002/0133418 | A1 | 9/2002 | Hammond et al. |
| 2002/0137217 | A1 | 9/2002 | Rowe et al. |
| 2002/0142825 | A1 | 10/2002 | Lark et al. |
| 2002/0147047 | A1 | 10/2002 | Letovsky et al. |
| 2002/0147049 | A1 | 10/2002 | Carter, Sr. |
| 2002/0151366 | A1 | 10/2002 | Walker et al. |
| 2002/0152120 | A1 | 10/2002 | Howington |
| 2002/0167536 | A1 | 11/2002 | Valdes et al. |
| 2002/0177483 | A1 | 11/2002 | Cannon |
| 2002/0183105 | A1 | 12/2002 | Cannon et al. |
| 2003/0001338 | A1 | 1/2003 | Bennett et al. |
| 2003/0008696 | A1 | 1/2003 | Abecassis et al. |
| 2003/0027635 | A1 | 2/2003 | Walker et al. |
| 2003/0064805 | A1 | 4/2003 | Wells |
| 2003/0064807 | A1 | 4/2003 | Walker et al. |
| 2003/0092480 | A1 | 5/2003 | White et al. |
| 2003/0100361 | A1 | 5/2003 | Sharpless et al. |
| 2003/0104860 | A1 | 6/2003 | Cannon et al. |
| 2003/0104865 | A1 | 6/2003 | Itkis et al. |
| 2003/0148809 | A1 | 8/2003 | Nelson |
| 2003/0162588 | A1 | 8/2003 | Brosnan et al. |
| 2003/0195024 | A1 | 10/2003 | Slattery |
| 2003/0199295 | A1 | 10/2003 | Vancura |
| 2003/0224852 | A1 | 12/2003 | Walker et al. |
| 2003/0224854 | A1 | 12/2003 | Joao |
| 2004/0002386 | A1 | 1/2004 | Wolfe et al. |
| 2004/0005919 | A1 | 1/2004 | Walker et al. |
| 2004/0023709 | A1 | 2/2004 | Beaulieu et al. |
| 2004/0023716 | A1 | 2/2004 | Gauselmann |
| 2004/0038736 | A1 | 2/2004 | Bryant |
| 2004/0048650 | A1 | 3/2004 | Mierau et al. |
| 2004/0068460 | A1 | 4/2004 | Feeley |
| 2004/0082385 | A1 | 4/2004 | Silva et al. |
| 2004/0106449 | A1 | 6/2004 | Walker et al. |
| 2004/0127277 | A1 | 7/2004 | Walker |
| 2004/0127290 | A1 | 7/2004 | Walker et al. |
| 2004/0137987 | A1 | 7/2004 | Nguyen et al. |
| 2004/0147308 | A1 | 7/2004 | Walker et al. |
| 2004/0152508 | A1 | 8/2004 | Lind |
| 2004/0214622 | A1 | 10/2004 | Atkinson |
| 2004/0224753 | A1 | 11/2004 | Odonovan et al. |
| 2004/0256803 | A1 | 12/2004 | Ko |
| 2004/0259633 | A1 | 12/2004 | Gentles et al. |
| 2005/0003890 | A1 | 1/2005 | Hedrick et al. |
| 2005/0004980 | A1 | 1/2005 | Vadjinia |
| 2005/0026696 | A1 | 2/2005 | Hashimoto et al. |
| 2005/0054446 | A1 | 3/2005 | Kammler |
| 2005/0101376 | A1 | 5/2005 | Walker et al. |
| 2005/0101383 | A1 | 5/2005 | Wells |
| 2005/0130728 | A1 | 6/2005 | Nguyen et al. |
| 2005/0137014 | A1 | 6/2005 | Vetelaninen |
| 2005/0181865 | A1 | 8/2005 | Luciano |
| 2005/0181870 | A1 | 8/2005 | Nguyen et al. |
| 2005/0181875 | A1 | 8/2005 | Hoehne |
| 2005/0187020 | A1 | 8/2005 | Amaitis et al. |
| 2005/0202875 | A1 | 9/2005 | Murphy et al. |
| 2005/0209002 | A1 | 9/2005 | Blythe et al. |
| 2005/0221881 | A1 | 10/2005 | Lannert |
| 2005/0223219 | A1 | 10/2005 | Gatto et al. |
| 2005/0239546 | A1 | 10/2005 | Hedrick |
| 2005/0255919 | A1 | 11/2005 | Nelson |
| 2005/0273635 | A1 | 12/2005 | Wilcox et al. |
| 2005/0277471 | A1 | 12/2005 | Russell et al. |
| 2005/0282637 | A1 | 12/2005 | Gatto et al. |
| 2006/0009283 | A1 | 1/2006 | Englman et al. |
| 2006/0036874 | A1 | 2/2006 | Cockerille |
| 2006/0046822 | A1 | 3/2006 | Kaminkow et al. |
| 2006/0046830 | A1 | 3/2006 | Webb |
| 2006/0046849 | A1 | 3/2006 | Kovacs |
| 2006/0068893 | A1 | 3/2006 | Jaffe et al. |
| 2006/0073869 | A1 | 4/2006 | LeMay et al. |
| 2006/0073897 | A1 | 4/2006 | Englman et al. |
| 2006/0079317 | A1 | 4/2006 | Flemming et al. |
| 2006/0148551 | A1 | 7/2006 | Walker et al. |
| 2006/0189382 | A1 | 8/2006 | Muir et al. |
| 2006/0217170 | A1 | 9/2006 | Roireau |
| 2006/0217193 | A1 | 9/2006 | Walker et al. |
| 2006/0247028 | A1 | 11/2006 | Brosnan et al. |
| 2006/0247035 | A1 | 11/2006 | Rowe et al. |
| 2006/0252530 | A1 | 11/2006 | Oberberger et al. |
| 2006/0253481 | A1 | 11/2006 | Guido et al. |
| 2006/0281525 | A1 | 12/2006 | Borissov |
| 2006/0281541 | A1 | 12/2006 | Nguyen et al. |
| 2006/0287106 | A1 | 12/2006 | Jensen |
| 2007/0004510 | A1 | 1/2007 | Underdahl et al. |
| 2007/0026935 | A1 | 2/2007 | Wolf et al. |
| 2007/0026942 | A1 | 2/2007 | Kinsley |
| 2007/0054739 | A1 | 3/2007 | Amaitis et al. |

(56) References Cited

U.S. PATENT DOCUMENTS

| | | | |
|---|---|---|---|
| 2007/0060254 | A1 | 3/2007 | Muir |
| 2007/0060306 | A1 | 3/2007 | Amaitis et al. |
| 2007/0060319 | A1 | 3/2007 | Block et al. |
| 2007/0060358 | A1 | 3/2007 | Amaitas et al. |
| 2007/0077981 | A1 | 4/2007 | Hungate et al. |
| 2007/0087833 | A1 | 4/2007 | Feeney et al. |
| 2007/0087834 | A1 | 4/2007 | Moser et al. |
| 2007/0093299 | A1 | 4/2007 | Bergeron |
| 2007/0129123 | A1 | 6/2007 | Eryou et al. |
| 2007/0149279 | A1 | 6/2007 | Norden et al. |
| 2007/0149286 | A1 | 6/2007 | Bemmel |
| 2007/0159301 | A1 | 7/2007 | Hirt et al. |
| 2007/0161402 | A1 | 7/2007 | Ng. et al. |
| 2007/0184896 | A1 | 8/2007 | Dickerson |
| 2007/0184904 | A1 | 8/2007 | Lee |
| 2007/0191109 | A1 | 8/2007 | Crowder et al. |
| 2007/0207852 | A1 | 9/2007 | Nelson et al. |
| 2007/0207854 | A1 | 9/2007 | Wolf et al. |
| 2007/0238505 | A1 | 10/2007 | Okada |
| 2007/0241187 | A1 | 10/2007 | Alderucci et al. |
| 2007/0248036 | A1 | 10/2007 | Nevalainen |
| 2007/0257430 | A1 | 11/2007 | Hardy et al. |
| 2007/0259713 | A1 | 11/2007 | Fiden et al. |
| 2007/0259717 | A1 | 11/2007 | Mattice et al. |
| 2007/0270213 | A1 | 11/2007 | Nguyen et al. |
| 2007/0275777 | A1 | 11/2007 | Walker et al. |
| 2007/0275779 | A1 | 11/2007 | Amaitis et al. |
| 2007/0281782 | A1 | 12/2007 | Amaitis et al. |
| 2007/0281785 | A1 | 12/2007 | Amaitas et al. |
| 2007/0298873 | A1 | 12/2007 | Nguyen et al. |
| 2008/0015032 | A1 | 1/2008 | Bradford et al. |
| 2008/0020824 | A1 | 1/2008 | Cuddy et al. |
| 2008/0032787 | A1 | 2/2008 | Low et al. |
| 2008/0070652 | A1 | 3/2008 | Nguyen et al. |
| 2008/0070681 | A1 | 3/2008 | Marks et al. |
| 2008/0076505 | A1 | 3/2008 | Nguyen |
| 2008/0076506 | A1 | 3/2008 | Nguyen et al. |
| 2008/0076548 | A1 | 3/2008 | Paulsen |
| 2008/0076572 | A1 | 3/2008 | Nguyen et al. |
| 2008/0096650 | A1 | 4/2008 | Baerlocher |
| 2008/0102956 | A1 | 5/2008 | Burman et al. |
| 2008/0102957 | A1 | 5/2008 | Burnman et al. |
| 2008/0113772 | A1 | 5/2008 | Burrill et al. |
| 2008/0119267 | A1 | 5/2008 | Denlay |
| 2008/0139306 | A1 | 6/2008 | Lutnick |
| 2008/0146321 | A1 | 6/2008 | Parente |
| 2008/0150902 | A1 | 6/2008 | Edpalm et al. |
| 2008/0153583 | A1 | 6/2008 | Huntley et al. |
| 2008/0161110 | A1 | 7/2008 | Campbell |
| 2008/0167106 | A1 | 7/2008 | Lutnick et al. |
| 2008/0182667 | A1 | 7/2008 | Davis et al. |
| 2008/0200251 | A1 | 8/2008 | Alderucci |
| 2008/0207307 | A1 | 8/2008 | Cunningham, II et al. |
| 2008/0214258 | A1 | 9/2008 | Brosnan et al. |
| 2008/0215319 | A1 | 9/2008 | Lu |
| 2008/0234047 | A1 | 9/2008 | Nguyen |
| 2008/0238610 | A1 | 10/2008 | Rosenbereg |
| 2008/0248849 | A1 | 10/2008 | Lutnick |
| 2008/0252419 | A1 | 10/2008 | Batchelor |
| 2008/0254878 | A1 | 10/2008 | Sauders et al. |
| 2008/0254881 | A1 | 10/2008 | Lutnick et al. |
| 2008/0254883 | A1 | 10/2008 | Patel et al. |
| 2008/0254891 | A1 | 10/2008 | Sauders et al. |
| 2008/0254892 | A1 | 10/2008 | Sauders et al. |
| 2008/0254897 | A1 | 10/2008 | Sauders et al. |
| 2008/0263173 | A1 | 10/2008 | Weber et al. |
| 2008/0300058 | A1 | 12/2008 | Sum et al. |
| 2008/0305864 | A1 | 12/2008 | Kelly et al. |
| 2008/0305865 | A1 | 12/2008 | Kelly et al. |
| 2008/0305866 | A1 | 12/2008 | Kelly et al. |
| 2008/0311994 | A1 | 12/2008 | Amaitas et al. |
| 2008/0318669 | A1 | 12/2008 | Buchholz |
| 2008/0318686 | A1 | 12/2008 | Crowder et al. |
| 2009/0005165 | A1 | 1/2009 | Arezina et al. |
| 2009/0011822 | A1 | 1/2009 | Englman |
| 2009/0029766 | A1 | 1/2009 | Lutnick et al. |
| 2009/0054149 | A1 | 2/2009 | Brosnan et al. |
| 2009/0077396 | A1 | 3/2009 | Tsai et al. |
| 2009/0088258 | A1 | 4/2009 | Saunders et al. |
| 2009/0098925 | A1 | 4/2009 | Gagner et al. |
| 2009/0104977 | A1 | 4/2009 | Zielinski |
| 2009/0104983 | A1 | 4/2009 | Okada |
| 2009/0118002 | A1 | 5/2009 | Lyons |
| 2009/0118013 | A1 | 5/2009 | Finnimore et al. |
| 2009/0118022 | A1 | 5/2009 | Lyons et al. |
| 2009/0124366 | A1 | 5/2009 | Aoki et al. |
| 2009/0124390 | A1 | 5/2009 | Seelig et al. |
| 2009/0131151 | A1 | 5/2009 | Harris et al. |
| 2009/0132163 | A1 | 5/2009 | Ashley et al. |
| 2009/0137255 | A1 | 5/2009 | Ashley et al. |
| 2009/0138133 | A1 | 5/2009 | Buchholz et al. |
| 2009/0149245 | A1 | 6/2009 | Fabbri |
| 2009/0149261 | A1 | 6/2009 | Chen et al. |
| 2009/0153342 | A1 | 6/2009 | Thorn |
| 2009/0156303 | A1 | 6/2009 | Kiely et al. |
| 2009/0176578 | A1 | 7/2009 | Herrmann et al. |
| 2009/0191962 | A1 | 7/2009 | Hardy et al. |
| 2009/0197684 | A1 | 8/2009 | Arezina et al. |
| 2009/0216547 | A1 | 8/2009 | Canora et al. |
| 2009/0219901 | A1 | 9/2009 | Bull et al. |
| 2009/0221342 | A1 | 9/2009 | Katz et al. |
| 2009/0227302 | A1 | 9/2009 | Abe |
| 2009/0239666 | A1 | 9/2009 | Hall et al. |
| 2009/0264190 | A1 | 10/2009 | Davis et al. |
| 2009/0271287 | A1 | 10/2009 | Halpern |
| 2009/0275410 | A1 | 11/2009 | Kisenwether et al. |
| 2009/0275411 | A1 | 11/2009 | Kisenwether et al. |
| 2009/0282469 | A1 | 11/2009 | Lynch |
| 2009/0298468 | A1 | 12/2009 | Hsu |
| 2010/0002897 | A1 | 1/2010 | Keady |
| 2010/0004058 | A1 | 1/2010 | Acres |
| 2010/0016069 | A1 | 1/2010 | Herrmann |
| 2010/0056248 | A1 | 3/2010 | Acres |
| 2010/0062833 | A1 | 3/2010 | Mattice et al. |
| 2010/0062840 | A1 | 3/2010 | Herrmann et al. |
| 2010/0079237 | A1 | 4/2010 | Falk |
| 2010/0081501 | A1 | 4/2010 | Carpenter et al. |
| 2010/0081509 | A1 | 4/2010 | Burke |
| 2010/0099499 | A1 | 4/2010 | Amaitis et al. |
| 2010/0106612 | A1 | 4/2010 | Gupta |
| 2010/0120486 | A1 | 5/2010 | DeWaal |
| 2010/0124967 | A1 | 5/2010 | Lutnick et al. |
| 2010/0130276 | A1 | 5/2010 | Fiden |
| 2010/0160035 | A1 | 6/2010 | Herrmann |
| 2010/0160043 | A1 | 6/2010 | Fujimoto et al. |
| 2010/0178977 | A1 | 7/2010 | Kim et al. |
| 2010/0197383 | A1 | 8/2010 | Rader et al. |
| 2010/0197385 | A1 | 8/2010 | Aoki et al. |
| 2010/0203955 | A1 | 8/2010 | Sylla |
| 2010/0203963 | A1 | 8/2010 | Allen |
| 2010/0227662 | A1 | 9/2010 | Speers et al. |
| 2010/0227670 | A1 | 9/2010 | Arezine et al. |
| 2010/0227671 | A1 | 9/2010 | Laaroussi |
| 2010/0227687 | A1 | 9/2010 | Speers et al. |
| 2010/0234091 | A1 | 9/2010 | Baerlocher et al. |
| 2010/0279764 | A1 | 11/2010 | Allen et al. |
| 2010/0323780 | A1 | 12/2010 | Acres |
| 2010/0325703 | A1 | 12/2010 | Etchegoyen |
| 2011/0009181 | A1 | 1/2011 | Speers et al. |
| 2011/0039615 | A1 | 2/2011 | Acres |
| 2011/0065492 | A1 | 3/2011 | Acres |
| 2011/0105216 | A1 | 5/2011 | Cohen |
| 2011/0111827 | A1 | 5/2011 | Nicely et al. |
| 2011/0111843 | A1 | 5/2011 | Nicely et al. |
| 2011/0111860 | A1 | 5/2011 | Nguyen |
| 2011/0118010 | A1 | 5/2011 | Brune |
| 2011/0159966 | A1 | 6/2011 | Gura et al. |
| 2011/0183732 | A1 | 7/2011 | Block |
| 2011/0183749 | A1 | 7/2011 | Allen |
| 2011/0207525 | A1 | 8/2011 | Allen |
| 2011/0212711 | A1 | 9/2011 | Scott |
| 2011/0212767 | A1 | 9/2011 | Barclay et al. |
| 2011/0223993 | A1 | 9/2011 | Allen et al. |
| 2011/0263318 | A1 | 10/2011 | Agarwal et al. |

(56) References Cited

U.S. PATENT DOCUMENTS

| | | | |
|---|---|---|---|
| 2011/0269548 | A1 | 11/2011 | Barclay et al. |
| 2011/0306400 | A1 | 12/2011 | Nguyen |
| 2011/0306426 | A1 | 12/2011 | Novak et al. |
| 2012/0015709 | A1 | 1/2012 | Bennett et al. |
| 2012/0028703 | A1 | 2/2012 | Anderson et al. |
| 2012/0028718 | A1 | 2/2012 | Barclay et al. |
| 2012/0034968 | A1 | 2/2012 | Watkins et al. |
| 2012/0046110 | A1 | 2/2012 | Amaitis |
| 2012/0094769 | A1 | 4/2012 | Nguyen et al. |
| 2012/0100908 | A1 | 4/2012 | Wells |
| 2012/0108319 | A1 | 5/2012 | Caputo et al. |
| 2012/0122561 | A1 | 5/2012 | Hedrick |
| 2012/0122567 | A1 | 5/2012 | Gangadharan et al. |
| 2012/0122584 | A1 | 5/2012 | Nguyen |
| 2012/0122590 | A1 | 5/2012 | Nguyen |
| 2012/0172130 | A1 | 7/2012 | Acres |
| 2012/0184362 | A1 | 7/2012 | Barclay et al. |
| 2012/0184363 | A1 | 7/2012 | Barclay et al. |
| 2012/0190426 | A1 | 7/2012 | Acres |
| 2012/0194448 | A1 | 8/2012 | Rothkopf |
| 2012/0208618 | A1 | 8/2012 | Frerking |
| 2012/0231885 | A1 | 9/2012 | Speer, II |
| 2012/0239566 | A1 | 9/2012 | Everett |
| 2012/0322563 | A1 | 12/2012 | Nguyen et al. |
| 2012/0330740 | A1 | 12/2012 | Pennington et al. |
| 2013/0005433 | A1 | 1/2013 | Holch |
| 2013/0005443 | A1 | 1/2013 | Kosta |
| 2013/0005453 | A1 | 1/2013 | Nguyen et al. |
| 2013/0059650 | A1 | 3/2013 | Sylla et al. |
| 2013/0065668 | A1 | 3/2013 | LeMay |
| 2013/0103965 | A1 | 4/2013 | Golembeski |
| 2013/0104193 | A1 | 4/2013 | Gatto et al. |
| 2013/0132745 | A1 | 5/2013 | Schoening et al. |
| 2013/0185559 | A1 | 7/2013 | Morel |
| 2013/0196756 | A1 | 8/2013 | Nguyen |
| 2013/0196776 | A1 | 8/2013 | Nguyen |
| 2013/0210513 | A1 | 8/2013 | Nguyen |
| 2013/0210514 | A1 | 8/2013 | Nguyen |
| 2013/0210530 | A1 | 8/2013 | Nguyen |
| 2013/0225279 | A1 | 8/2013 | Patceg |
| 2013/0225282 | A1 | 8/2013 | Williams et al. |
| 2013/0252730 | A1 | 9/2013 | Joshi |
| 2013/0281188 | A1 | 10/2013 | Guinn |
| 2013/0316808 | A1 | 11/2013 | Nelson |
| 2014/0006129 | A1 | 1/2014 | Heath |
| 2014/0057716 | A1 | 2/2014 | Massing et al. |
| 2014/0087862 | A1 | 3/2014 | Burke |
| 2014/0094295 | A1 | 4/2014 | Nguyen |
| 2014/0094316 | A1 | 4/2014 | Nguyen |
| 2014/0121005 | A1 | 5/2014 | Nelson |
| 2014/0179431 | A1 | 6/2014 | Nguyen |
| 2014/0274309 | A1 | 9/2014 | Nguyen |
| 2014/0274319 | A1 | 9/2014 | Nguyen |
| 2014/0274320 | A1 | 9/2014 | Nguyen |
| 2014/0274342 | A1 | 9/2014 | Nguyen |
| 2014/0274357 | A1 | 9/2014 | Nguyen |
| 2014/0274360 | A1 | 9/2014 | Nguyen |
| 2014/0274367 | A1 | 9/2014 | Nguyen |
| 2014/0274388 | A1 | 9/2014 | Nguyen |
| 2015/0089595 | A1 | 3/2015 | Telles |
| 2015/0133223 | A1 | 5/2015 | Carter |
| 2015/0143543 | A1 | 8/2015 | Phegade |
| 2017/0116819 | A1 | 4/2017 | Nguyen |
| 2017/0116823 | A1 | 4/2017 | Nguyen |
| 2017/0144071 | A1 | 5/2017 | Nguyen |
| 2017/0148259 | A1 | 5/2017 | Nguyen |
| 2017/0148263 | A1 | 5/2017 | Nguyen |
| 2017/0206734 | A1 | 7/2017 | Nguyen |
| 2017/0228979 | A1 | 8/2017 | Nguyen |
| 2017/0243440 | A1 | 8/2017 | Nguyen |
| 2017/0337770 | A1 | 11/2017 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Finnegan, Amanda, "Casinos Connecting with Customers via Iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
iAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717, dated Jun. 17, 2013.
Office Action for U.S. Appl. No. 12/797,610 dated Dec. 8, 2011.

(56) References Cited

OTHER PUBLICATIONS

Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.

(56) References Cited

OTHER PUBLICATIONS

Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/801,256, dated Aug. 18, 2017.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.

ADAPTIVE MOBILE DEVICE GAMING SYSTEM

CROSS-REFERENCE TO OTHER APPLICATIONS

This application is a continuation of U.S. patent application Ser. No. 14/211,536, filed Mar. 14, 2014, and entitled "ADAPTIVE MOBILE DEVICE GAMING SYSTEM", which is hereby incorporated by reference herein, and which in turn claim priority to (i) U.S. Provisional Patent Application No. 61/873,300, filed Sep. 3, 2013, and entitled "ADAPTIVE MOBILE DEVICE GAMING SYSTEM", which is hereby incorporated by reference herein; and (ii) U.S. Provisional Patent Application No. 61/799,862, filed Mar. 15, 2013, and entitled "ADAPTIVE MOBILE DEVICE GAMING SYSTEM", which is hereby incorporated by reference herein.

This application also incorporates by reference herein the following applications: (i) U.S. patent application Ser. No. 14/017,159 filed Sep. 3, 2013, and entitled "METHOD AND SYSTEM FOR LOCALIZED MOBILE GAMING"; and (ii) U.S. Provisional Patent Application No. 14/017,150 filed Sep. 3, 2013, and entitled "METHOD AND SYSTEM FOR LOCALIZED MOBILE GAMING".

BACKGROUND OF THE INVENTION

Today, mobile betting is available at designated sports betting areas of casinos. However, this means that mobile betting is not available when one is not at a designated sports betting area. This is a burden to customer and leads to limited opportunities for sports betting. Mobile gaming has been contemplated but gaming regulations hinder its implementation.

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic devices may be configured to be updated so as allow for the presentation of additional multimedia services or applications. Portable electronic devices may also be configured to have wireless transmission and receiving capabilities so as to permit communication with one or more other sources.

Hence, there is a need for improved approaches to enhance mobile betting or gaming opportunities.

SUMMARY

Embodiments disclosed herein concern mobile gaming environments. Portable electronic devices can be supported by the mobile gaming environments. The locations of the portable electronic devices can influence how the portable electronic devices operate and/or what services or features are available to the portable electronic device or their users.

According to one embodiment, a mobile gaming system can concern gaming/betting opportunities that can be secured using a portable electronic device even when an individual is located in a location where betting or games of chance are not permitted. A betting opportunity that has been secured can later be activated when the portable electronic device associated with the individual later resides in a location where betting or games of chance are permitted.

According to another embodiment, a mobile gaming system can concern an application program operating on a portable electronic device that supports multiple modes of operation depending upon whether the portable electronic device is in a location where betting or games of chance are permitted. The application can adapt or transform itself (i.e., switch modes), automatically or with user assistance, depending upon whether the portable electronic device is in a location where betting or games of chance are permitted. When the portable electronic device is in a location where betting or games of chance are not permitted, the application program can still operate (i.e., permit non-wagering usage) and enable its user to earn rewards, advantages, tools, etc. without actually betting (e.g., wagering). Further, the rewards, advantages, tools, etc. being earned can be used directly or can be used following a conversion to something useable in betting/games of chance when the portable electronic device is later located where betting or games of chance is permitted. The application program can also allow the user to play a betting/game of chance for practice or for simulation of virtual betting.

The invention can be implemented in numerous ways, including as a method, system, device, apparatus (including computer readable medium and graphical user interface). Several embodiments of the invention are discussed below.

As a non-transitory computer readable medium including at least computer program code for an application program stored thereon, where the application program is executable by a computing device, one embodiment can, for example, include at least: computer program code for determining whether the computing device is in a gaming authorized location or a gaming unauthorized location; computer program code for operating the application program in a non-gaming mode if the location of the computing device is located in a gaming unauthorized location; and computer program code for operating the application program in a gaming mode if the location of the computing device is located in a gaming authorized location.

As a method for facilitating gaming via portable electronic devices, one embodiment can, for example, include at least: causing a betting opportunity to be presented to a user via a portable electronic device associated with the user; receiving, at a gaming server, a bet amount for the betting opportunity from the portable electronic device; determining whether the portable electronic device is in a betting authorized location; placing a bet corresponding to the betting opportunity in the bet amount for the user if the determining determines that the portable electronic device is in a betting authorized location; and deferring placing of the bet corresponding to the betting opportunity in the bet amount for the user if the determining determines that the portable electronic device is not in a betting authorized location.

As a non-transitory computer readable medium including at least computer program code for an application program stored thereon, where the application program is executable by a computing device, one embodiment can, for example, include at least: computer program code for causing presentment of a betting opportunity via the application program; computer program code for determining whether a user of the application program desires to pursue the betting opportunity; computer program code for determining whether the computing device is in a gaming authorized location or a gaming unauthorized location; and computer program code for initiating locking in the betting opportunity for future execution for the user of the computing device is determined to be in a gaming unauthorized location.

As a method for provided a betting opportunity using a portable electronic device, one embodiment can, for example, include at least: causing presentment of a betting opportunity via the portable electronic device; determining whether a user of the portable electronic device desires to pursue the betting opportunity; determining whether the portable electronic device is in a gaming authorized location or a gaming unauthorized location; and initiating locking in the betting opportunity for future execution if the portable electronic device subsequently is determined to be in a gaming authorized location.

As a method for facilitating gaming via portable electronic devices, one embodiment can, for example, include at least: displaying a betting opportunity to a user via a portable electronic device associated with the user; receiving, using the portable electronic device, a bet amount for the betting opportunity; displaying a bet option fee for locking in a bet option to make the bet amount; receiving, using the portable electronic device, an acceptance of the bet option fee; and initiating locking of the option to make the bet amount for the user.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Embodiments disclosed herein concern mobile gaming environments. Portable electronic devices can be supported by the mobile gaming environments. The locations of the portable electronic devices can influence how the portable electronic devices operate or what services or features are available to the portable electronic device or their users.

According to one embodiment, a mobile gaming system can concern gaming/betting opportunities that can be secured using a portable electronic device even when an individual is located in a location where betting or games of chance are not permitted. A betting opportunity that has been secured can later be activated when the portable electronic device associated with the individual later resides in a location where betting or games of chance are permitted.

According to another embodiment, a mobile gaming system can concern an application program operating on a portable electronic device that supports multiple modes of operation depending upon whether the portable electronic device is in a location where betting or games of chance are permitted. The application can adapt or transform itself (i.e., switch modes), automatically or with user assistance, depending upon whether the portable electronic device is in a location where betting or games of chance are permitted. When the portable electronic device is in a location where betting or games of chance are not permitted, the application program can still operate (i.e., permit non-wagering usage) and enable its user to earn rewards, advantages, tools, etc. without actually betting (e.g., wagering). Further, the rewards, advantages, tools, etc. being earned can be used directly or can be used following a conversion to something useable in betting/games of chance when the portable electronic device is later located where betting or games of chance is permitted. The application program can also allow the user to play a betting/game of chance for practice or for simulation of virtual betting.

Embodiments of various aspects of the invention are discussed below with reference to FIGS. 1-6. However, those skilled in the art will readily appreciate that the detailed description given herein with respect to these figures is for explanatory purposes as the invention extends beyond these limited embodiments.

Figure 1:
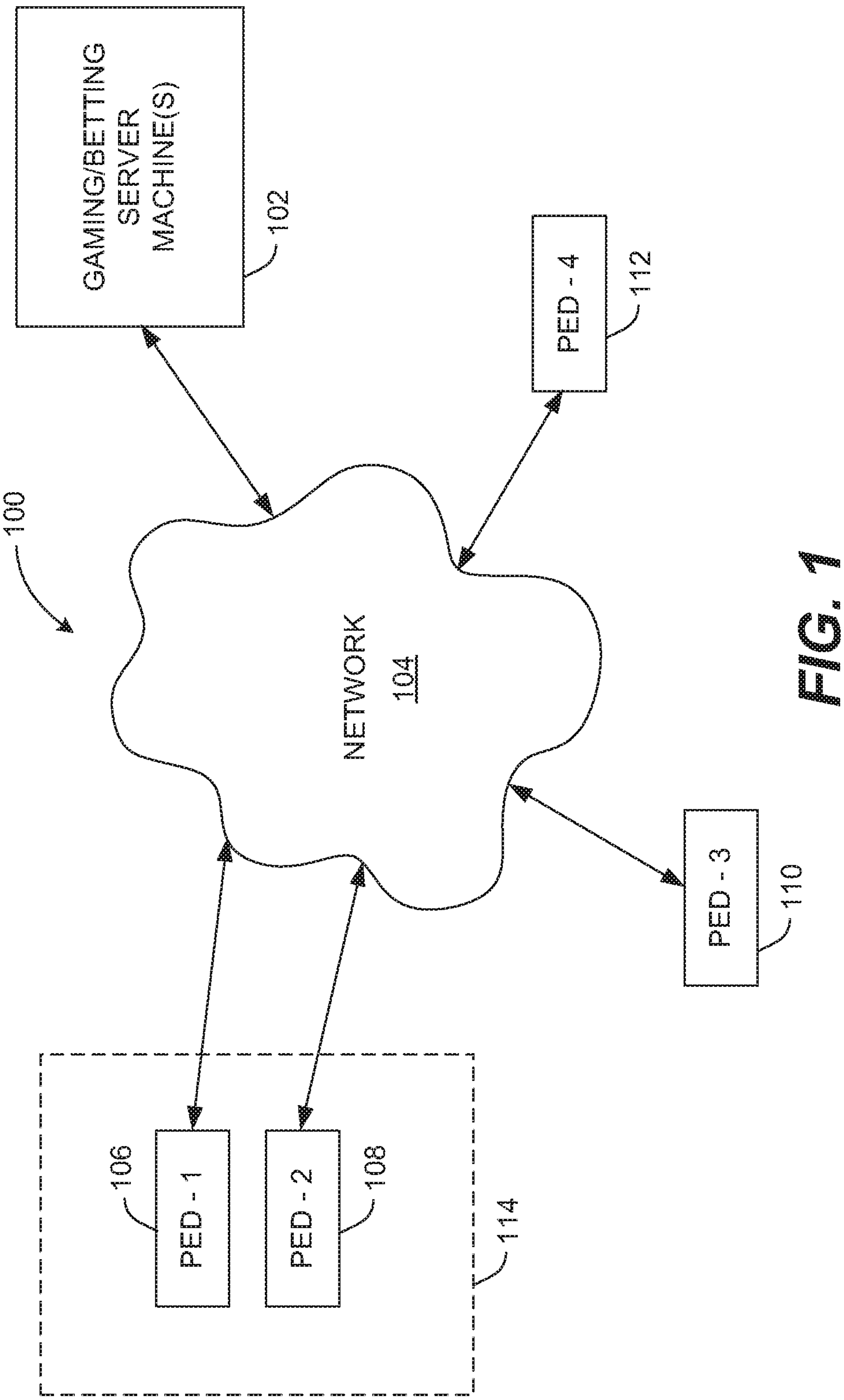
FIG. 1 is a block diagram of a mobile gaming/betting system according to one embodiment.

FIG. 1 is a block diagram of a mobile gaming/betting system 100 according to one embodiment. The mobile gaming/betting system 100 includes a one or more gaming/betting server machines 102. The one or more gaming/betting server machines 102 can manage, coordinate or process gaming/betting with respect to a plurality of portable electronic devices. The gaming/betting server machines 102 can also manage, coordinate or process gaming/betting with respect to other electronic devices, including various games of chance, including stationary gaming machines or stationary table games. The mobile gaming/betting server machines 102 can couple to a network 104. The network 104 can include one or more private networks or public networks, including wired and/or wireless networks. The mobile gaming/betting system 100 can also support a plurality of portable electronic devices (PEDs). As illustrated in FIG. 1, the depicted plurality of PEDs can, in a simplified representative situation, include PED-1 106, PED-2 108, PED-3 110 and PED-4 112. In general, although the PEDs of FIG. 1 can also be referred to as Portable Gaming Devices (PGDs) since they can support gaming/betting.

Given various legal restrictions on gaming or betting, it is often the case that gaming/betting is only available in certain locations. These locations can correspond to states, Indian reservations, casino establishments, or specific areas (such as rooms, floors, tables) at casino establishments or cruise ships. Accordingly, it can be advantageous for the mobile gaming/betting system 102 to control gaming/betting by PEDs based upon the location of the PEDs. As illustrated in FIG. 1, the mobile gaming/betting system 100 can also illustrate a gaming/betting authorized region 114, which represents a location where gaming/betting is permissible. As illustrated in FIG. 1, the PED-1 106 and the PED-2 108 are currently within the gaming/betting authorized region 114. Consequently, the PET-1 106 and the PET-2 108 are permitted to perform gaming/betting activities with assistance of the one or more gaming/betting server machines 102. However, since the PED-3 110 and the PED-4 112 are presently not within a gaming/betting authorized region, these mobile devices are not permitted to participate in gaming/betting activities at this time. It should be understood that at some future point in time, if the PED-3 110 and/or the PED-4 112 are then located in a gaming/betting authorized region, these PEDs 110 and 112 would then be able to participate in gaming/betting activities.

Nevertheless, when the PEDs are not within a gaming/betting authorized region, the PEDs can still operate to facilitate user participation or interaction with users even though gaming/betting activities are not permitted. For example, a player can play along, without placing a monetary wager, with a live table game taking place at a casino. While entertaining, such a practice mode also allows a player to get familiar with a new game, to practice back betting (e.g., betting on the active live players, not on the games), to hone his game strategies, to play along with a friend who is at the casino, etc. The participation or interaction with the PEDs when gaming/betting is unavailable can yield awards, benefits or advantages. In some cases, the awards, benefits or advantages can be used when the PEDs are later in a location where gaming/betting activities are permitted. This participation or interaction can vary depending upon implementation.

In one implementation, an application program operating on a corresponding PED dynamically adjusts (e.g., transforms) its operation depending upon whether gaming/betting activities are permitted. In the case in which gaming/betting activities are not permitted, the application program can allow non-gaming play in which a user can accrue awards or other benefits (e.g., coupons, points, tools, virtual goods, secret prizes, etc.) that may or may not be able to be used directly in the application program when the PED is later within a gaming/betting authorized region. One example of a tool that could be accrued is a gaming tool to give the user a guide or hint as to desirable location, machines or action within a casino establishment. Virtual goods are game assets (e.g., game currency) that normally do not have value outside of the game or outside of a designated gaming location. Secret prizes maybe awarded in play-along game mode, but can only be revealed and redeemed by the user at designated gaming locations.

In another implementation, a PED, or an application program operating on the PED, can permit a user to secure a bet opportunity even while in a location that is not a gaming/betting authorized region. For example, the PED can facilitate the user in securing an option to later activate a bet when the PED is within a gaming/betting authorized region. In effect, the PED can operate to provide deferred betting (e.g., sports betting), whereby a bet is reserved until the PED and its user are in a location that is gaming/betting authorized.

Figure 2A:
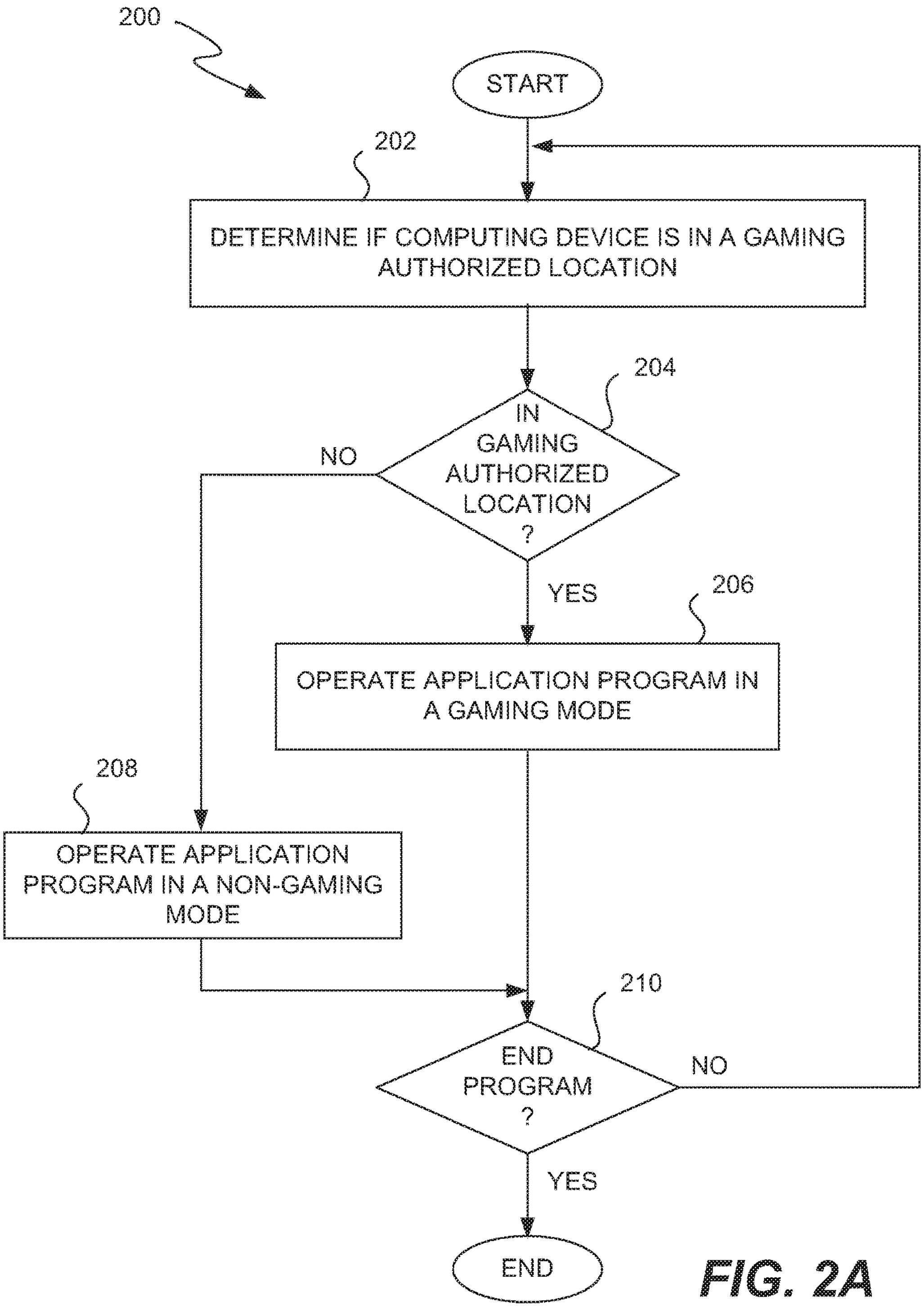
FIG. 2A is a flow diagram of an application mode process according to one embodiment.

FIG. 2A is a flow diagram of an application mode process 200 according to one embodiment. The application mode process 200 can be performed by a computing device. For example, the computing device can be a personal computing device, such as a mobile computing device (or portable electronic device), that is capable of operating application programs. One example of such a mobile computing device is a smart phone. Another example of such a mobile computing device is a tablet computer or notebook computer.

The application mode process 200 can determine 202 If the computing device is in a gaming authorized location. The gaming authorized location has a geographic significance. For example, the gaming authorized location can be a state wide location, an establishment wide location, or an internal area within an establishment. A decision 204 can evaluate whether the computing device is in a gaming authorized location. When the decision 204 determines that the computing device is in a gaming authorized location, the computing device can operate 206 the application program in a gaming mode. For example, when the application is operated in a gaming mode, the application program can operate to provide a game of chance for a user of the computing device and/or provide an ability to place a bet (e.g., sports betting) via the computing device.

On the other hand, when the decision 204 determines that the computing device is not in a gaming authorized location, the application program can operate 208 in a non-gaming mode. In the non-gaming mode, the application program does not permit operating of a game of chance or placing of a bet. However, in one embodiment, the application program can offer a non-gaming alternative, which can enable the user to still interact with the application program. In one embodiment, the operation of the application program in the non-gaming mode can allow the user to win or accrue awards, assets, tools, features or benefits that are usable or convertible either for use with the application program when operating in the gaming mode or for use with another device (e.g., stationary gaming machine).

In another embodiment, the user can play along by executing the application as intended, but without actually placing a monetary bet (e.g., simulation mode). The user can practice to gain experience on a game, to test his skills, to gain familiarity with a new game, etc. For example, a user in a non-gaming location can monitor a live video broadcast of a game of Craps taking place at the gaming location. The user can join in and bet with virtual chips in a simulated game and see the real result of his virtual wager in the context of the real, live game. Thus, the user stays engaged by learn to play without risking money. The user can be at or distant from the gaming location.

Following the blocks 206 or 208, a decision 210 can determine whether the application program should end. When the decision 210 determines that the application program should not end, the application process 200 can return to repeat the block 202 and subsequent blocks so that the operation of the application program can dynamically alter its operation, such as switching between the gaming mode and the non-gaming mode, based on the location of the computing device. In some embodiments, switching from gaming mode to non-gaming mode (e.g., switch to play-along or free-play mode) maybe allowed even when the user is at an authorized gaming location so that the user can practice without risking money until she is ready. Mode switching can be automatically performed without user participation, or can switch only on user request or authorization. Alternatively, when the decision 210 determines that the application mode process 200 should end, the application mode process 200 can end.

Figure 2B:
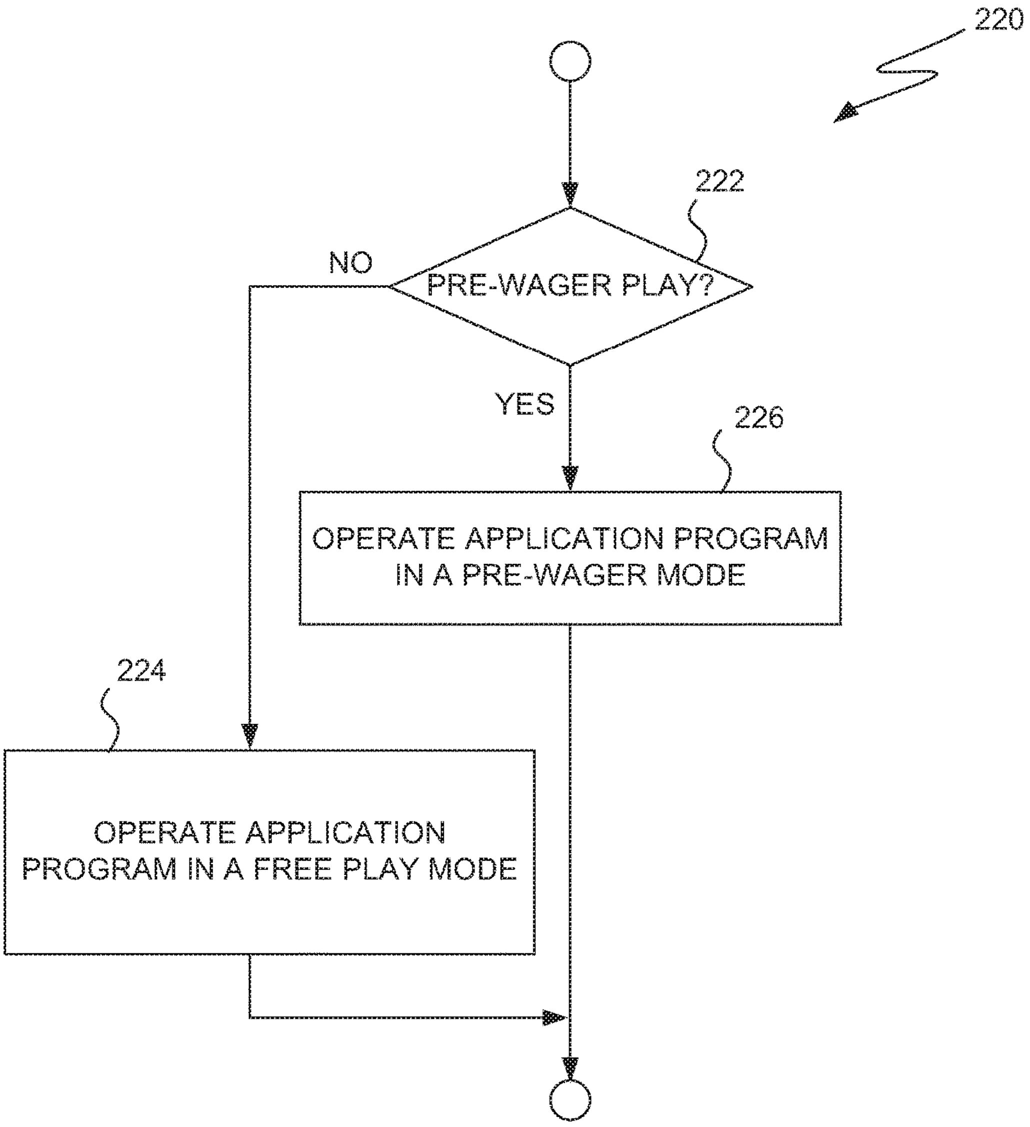
FIG. 2B is a flow diagram of a pre-wager mode process according to one embodiment.

FIG. 2B is a flow diagram of a pre-wager mode process 220 according to one embodiment. The pre-wager mode process 220 can be performed when the application program operates in a non-gaming mode, such as within block 208 of FIG. 2A. In the pre-wager mode process 220, a decision 222 can determine whether pre-wager play is being requested. When the decision 222 determines that pre-wager play is not requested, the application program can be operated 224 in a free play mode. In the free play mode, the user can operate the application program without any wagering or cost to the player. Free play mode can be applied to any casino game. A special case of free play is the play along mode where a user at a non-gaming location plays along with a live game (e.g., Roulette) at a gaming-authorized location as if he was there, although no monetary betting takes place. On the other hand, when the decision 222 determines that the pre-wager play has been requested, the application program can operate 226 in a pre-wager mode. In the pre-wager mode, the application program allows a user to configure a wager that may be activated in the future. In other words, the user can schedule a wager to occur in the future. Following the blocks 224 or 226, the pre-wager mode process 220 can, for example, return to block 208 (or decision 210) of the application mode process 200 illustrated in FIG. 2A.

Figure 2C:
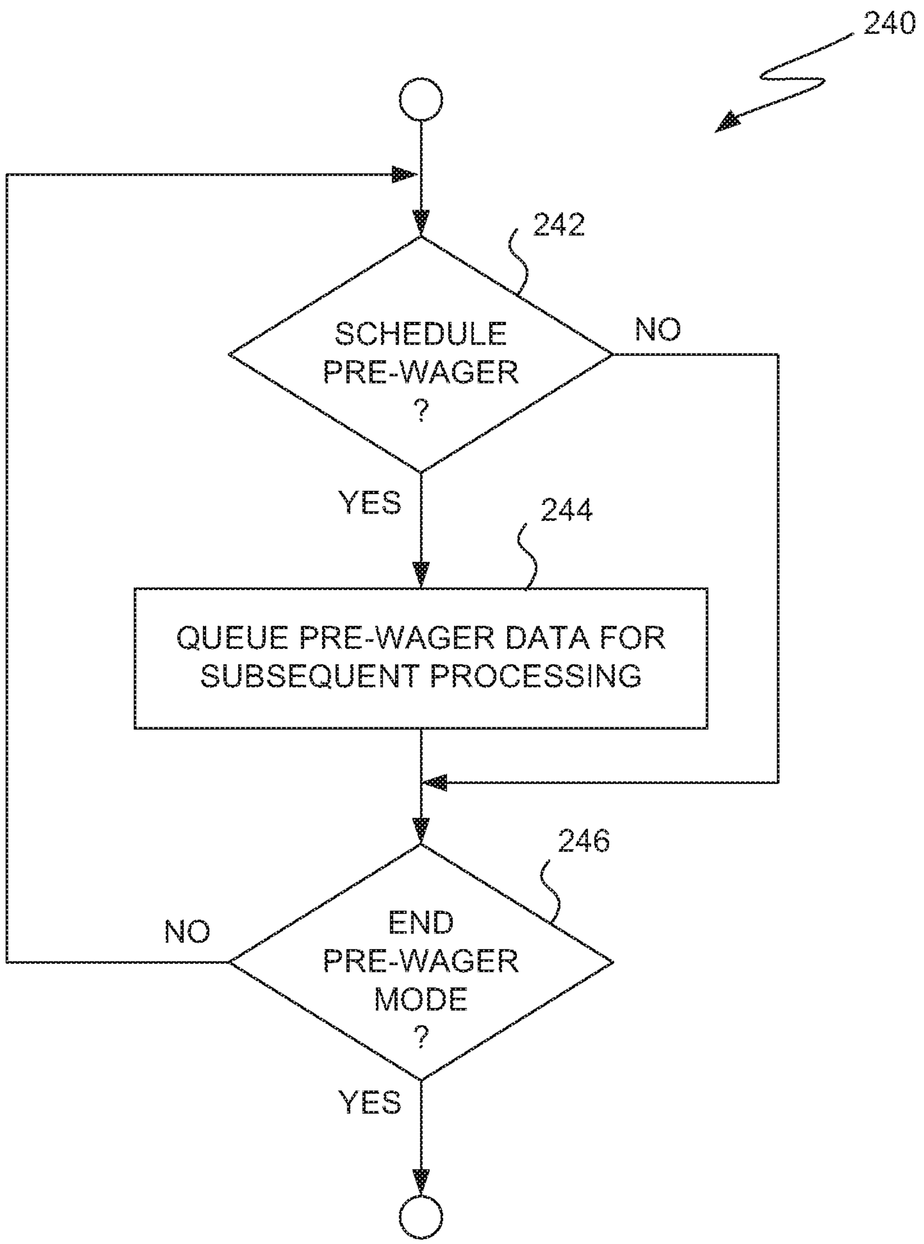
FIG. 2C is a flow diagram of a pre-wager scheduling process according to one embodiment.

FIG. 2C is a flow diagram of a pre-wager scheduling process 240 according to one embodiment. The pre-wager scheduling process 240 can be performed when the application program operates in the pre-wager mode, such as associated with the block 226 illustrated in FIG. 2B. According to the pre-wager scheduling process 240, a decision 242 can determine whether a pre-wager is to be scheduled. When the decision 242 determines that a pre-wager is to be scheduled, pre-wager data can be queued 244 for subsequent processing. Next, a decision 246 can determine whether the pre-wager mode is to end. When the decision 246 determines that the pre-wager mode is not to end, the pre-wager scheduling process 240 returns to repeat the decision 242 and subsequent blocks. On the other hand, when the decision 246 determines that the pre-wager mode is to end, the pre-wager scheduling process 240 can and processing can, for example, return to the block 208 (or the decision 210) of the application mode process 200 illustrated in FIG. 2A. Additionally, it should be noted that when the decision 242 determines that a pre-wager is not to be scheduled, the block 244 can be bypassed.

Figure 3:
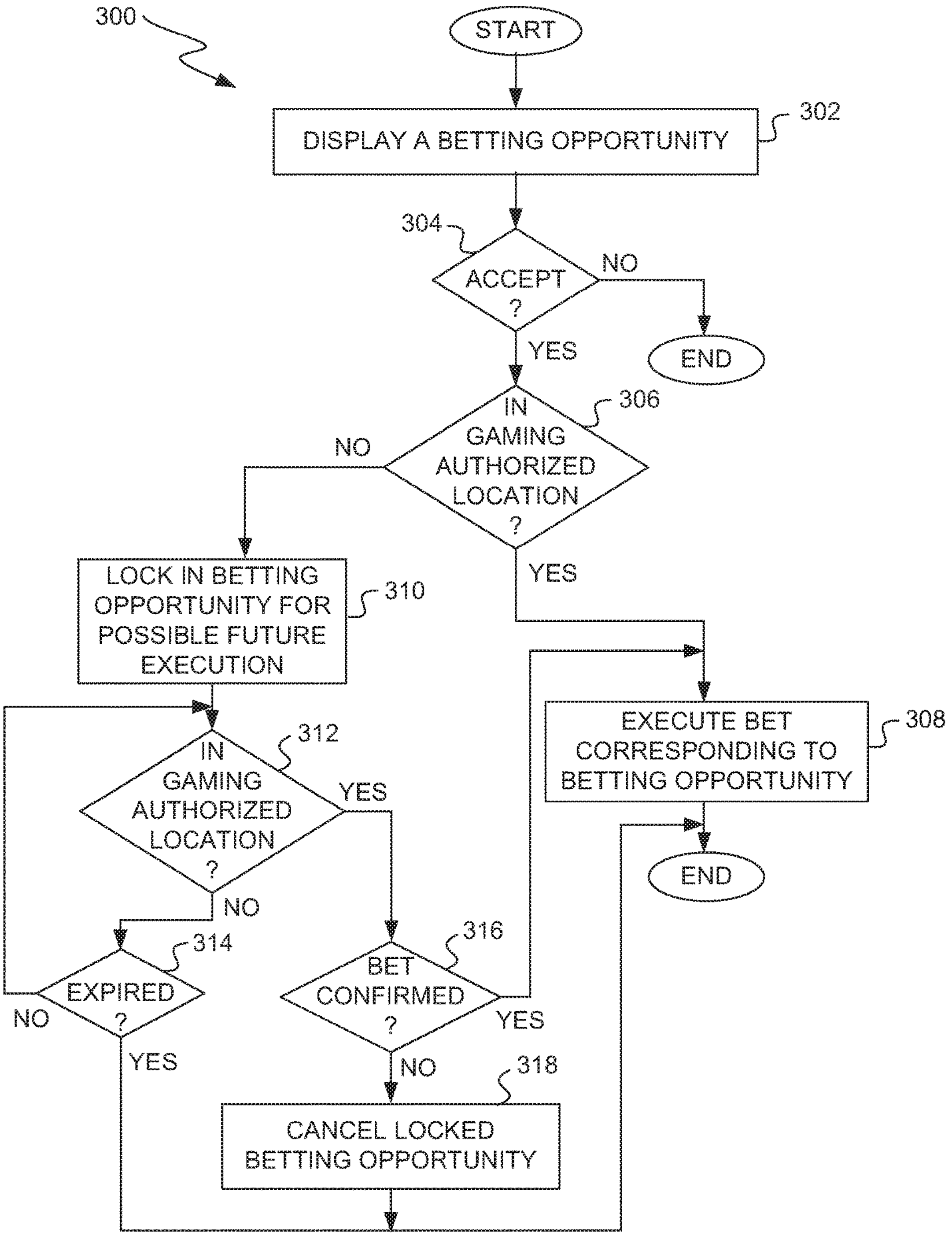
FIG. 3 is a flow diagram of a location-based betting process according to one embodiment.

FIG. 3 is a flow diagram of a location-based betting process 300 according to one embodiment. The location-based betting process 300 can facilitate initiation of bets using a portable electronic device, even if the portable electronic device is in a location where gaming is not authorized.

The location-based betting process 300 illustrated in FIG. 3 can display 302 a betting opportunity. Here, the betting opportunity can be displayed on a display associated with the portable electronic device. The betting opportunity can be provided to the portable electronic device from a server computer (e.g., gaming/betting server machine). The portable electronic device can operate an application program that can receive and display information on the betting opportunity.

Next, a decision 304 can determine whether the betting opportunity has been accepted. Here, a user of the portable electronic device can review the betting opportunity being displayed 302 and decide whether to accept or decline the betting opportunity. When the decision 304 determines that the betting opportunity has not been accepted (i.e., declined), the location-based betting process 300 can end.

Alternatively, when the decision 304 determines that the betting opportunity has been accepted, a decision 306 can determine whether the portable electronic device is in a gaming authorized location. When the decision 306 determines that the portable electronic device is in a gaming authorized location, the bet corresponding to the betting opportunity can be executed 308. Here, a user of the portable electronic device can accept the betting opportunity so long as the portable electronic device is in a gaming authorized location. The betting opportunity being accepted can be selected, customized or altered in view of desires of the user. In any case, after a bet corresponding to the betting opportunity has been executed 308 for the user, the location-based betting process 300 can end.

On the other hand, when the decision 306 determines that the portable electronic device is not in a gaming authorized location, a bet corresponding to the betting opportunity is not permitted to be executed. However, in this situation, the betting opportunity can be locked in 310 for possible future execution. By locking in 310 the betting opportunity, the user of the portable electronic device can effectively secure the betting opportunity for future execution so long as the portable electronic device reaches a gaming authorized location in a timely manner. In this case, the user secured the right to place the bet at a future time. The bet option must be exercised prior to execution of the game or prior to the presentation of the game result. Otherwise, the bet option expires and becomes worthless. In one example, a user may secure an option to place a $100 bet, at a given odd and pay out schedule. The bet can be premised on any of a variety of betting opportunities. As one example, the bet might be premised on the San Francisco 49ers winning the Super Bowl. As another example, the bet might be premised on the National Lottery's grand prize not having a winner over the next two drawings. If the bet option isn't exercised (e.g., by placing the actual bet at an authorized location) before the cut-off deadline (e.g., before the start of the game, before the next two drawings, etc.), the bet option expires.

The location-based betting process 300 can further include a decision 312 that determines whether the portable electronic device is in a gaming authorized location. When the decision 312 determines that the portable electronic device is not in a gaming authorized location, a decision 314 can determine whether the locked betting opportunity has expired. Typically, after the betting opportunity is locked in 310, the locking thereof can have a time limit (e.g., predetermined expiration or predetermined duration) after which the locked betting opportunity expires. Hence, when the decision 314 determines that the locked betting opportunity has not expired, the location-based betting process 300 can return to repeat the decision 312 so that the location monitoring can continue. In this example, the location monitoring can be dynamically performed by the portable electronic device without the request for assistance of the user. However, in an alternative embodiment, it should be understood that the portable electronic device could check its location on request from the user of the portable electronic device. In the case where the decision 314 determines that the locked betting opportunity has expired, the location-based betting process 300 can end.

Alternatively, when the decision 312 determines that the portable electronic device is in a gaming authorized location, a decision 316 can determine whether the bet associated with the locked betting opportunity is confirmed. Here, the location-based betting process 300 can allow the user of the portable electronic device to confirm that the bet corresponding to the locked betting opportunity is still to be made. When the decision 316 determines that the bet has been confirmed, the location-based betting process 300 can proceed to the block 308 where a bet corresponding to the locked betting opportunity can be executed. On the other hand, when the decision 316 determines that the user has not confirmed (i.e., declined) the bet corresponding to the locked betting opportunity, the locked betting opportunity can be canceled 318. After the locked betting opportunity has been canceled 318, the location-based betting process 300 can end.

The scope or size of a gaming authorized location can vary depending on implementation. In one implementation, the gaming authorized location can be associated with an area or zone established by a wireless network. In another implementation, the gaming authorized location can be established by a registration site, which can established physical presence or close proximity of the portable gaming device. In still another implementation, the gaming authorized location can be established by both a wireless network and/or a registration site. The gaming authorized location can be implemented by or proximate to a kiosk, a bank of gaming machines (e.g., bank of slot machines or video gaming machines), a table game, a room, or an area (e.g., stadium, casino floor, convention center).

There are various approaches for determining whether a portable electronic device (e.g., PED) is in a gaming authorized location. Any one or more of these techniques can be used for the block 204 of FIG. 2A or the blocks 306 or 312 of FIG. 3.

The location of a portable electronic device can be determined by various techniques. In one embodiment, the detection of a mobile electronic device within a gaming authorized location can be achieved using the wireless technologies (e.g., wireless geofencing). For example, relatively short range wireless technologies such as Bluetooth, near field communications (NFC), or radio frequency identification (RFID) can be used to evaluate whether the portable electronic device is within a gaming authorized location. As an example, placing one or more device registration sites within a gaming authorized location, such as an authorized gaming zone, can be used to determine the location of portable electronic devices. In one embodiment, in order to be recognized as within a gaming authorized location, the portable electronic device must be within wireless range of a wireless source provided by the device registration sites within the gaming authorized location. In one implementation, the wireless technologies being used for this purpose can be provided for this specific purpose of establishing a gaming authorized location. In another implementation, the wireless technologies can be generally provided within an establishment or larger area but can also be used to establish the position of the mobile electronic device (i.e., whether within the gaming authorized location). Examples of wireless technologies for mobile device locationing in larger areas include Wi-Fi, WiMax, LTE, Cellular, and the like. Satellite-based location technology such as GPS can also be used. In one approach, some combinations of these wireless technologies are used at the same time, depending on which signal is available, to increase the accuracy of the locationing technique.

In another embodiment, the detection of a mobile electronic device within a gaming authorized location can be achieved using a physical event between the mobile electronic device and device registration sites within a gaming authorized location. For example, the mobile electronic device associated with the user that is desirous of participating in games of chance, or otherwise wagering, can physically contact their mobile electronic device to a device registration site within a gaming authorized location. This can establish a pairing or registration of the mobile electronic device, if desired, and can confirm its presence within the gaming authorized location. The physical contact can establish physical presence. For example, the physical contact can be achieved using a registration site that can receive a "bump" from a portable electronic device. Additional details on a "bump" event and its processing can be found in (i) U.S. patent application Ser. No. 13/622,702, filed Sep. 19, 2012 and entitled "Multi-Functional Peripheral Device," which is hereby incorporated herein by reference; and (ii) U.S. patent application Ser. No. 12/945,888, filed Nov. 14, 2010 and entitled "Multi-Functional Peripheral Device," which is hereby incorporated herein by reference. As an alternative, the device registration site can also be implemented as a docking station. In such an implementation, a mobile gaming device can dock itself into the docking station to provide a pairing or registration and/or to confirm its presence.

As previously noted, the location of a portable electronic device can be determined by various techniques. Additionally, in some embodiments, it may be advantageous to make use of a plurality of different techniques to establish and/or maintain knowledge of the location of a portable electronic device. The advantages offered by using multiple techniques can include redundancy, enhanced reliability and improved security. In one implementation, a localized location detection technique, whether dedicated or not, could be utilized to establish initial authorized location of a portable electronic device. Then, for subsequent location monitoring, a wider location detection technique could be utilized to monitor the location of the portable electronic device. One example of this combine technique could be to use a short range wireless technique (e.g., Bluetooth, RFID, NFC) initially, followed by a midrange wireless technique (e.g., Wi-Fi, WiMax, LTE).

Further still, in other embodiments, it may be useful to utilize one wireless technique for location monitoring, and a separate wireless technique for wireless communication. For example, the location monitoring could utilize a localized wireless technique (e.g., Bluetooth) but for data communication a more pervasive network, such as Wi-Fi or cellular networks, could utilized.

In some embodiments, it may be required or useful to subsequently re-determine whether a portable electronic device (e.g., PED) is in a gaming authorized location. For example, if the block 204 determines that the computing device (i.e., portable electronic device) is in a gaming authorized location, then at block 206, the application program can operate 206 in a gaming mode. The ability of the application program to operate 206 in a gaming mode can be controlled at (i) the device or application level, (ii) the server level which provides or supports the gaming via the application program, or (iii) a combination thereof. After the gaming mode of the application program is made available on the computing device, it may be required or useful to determine whether the computing device is still within the gaming authorized location. Any one or more of the above-noted techniques for determining whether the computing device is within a gaming authorized location can be used for such re-determining. It should also be understood that the frequency or rate of re-determining can vary with implementation. As one example, the re-determining can be done on a periodic basis. As another example, the re-determining can be performed when a gaming action is requested.

In one embodiment, a remote server can be utilized to store information on whether portable electronic devices are in gaming authorized locations. That is, with the assistance of other computing devices, a remote server (that is, a server machine) can manage the storage of such gaming authorization data in a database that is maintained and frequently updated. As a result, when a determination is needed to evaluate whether a particular portable electronic device is within a gaming authorized location, the remote server can itself or on request query the database and rapidly determine whether the particular portable electronic device is within a gaming authorized location.

Figure 4A:
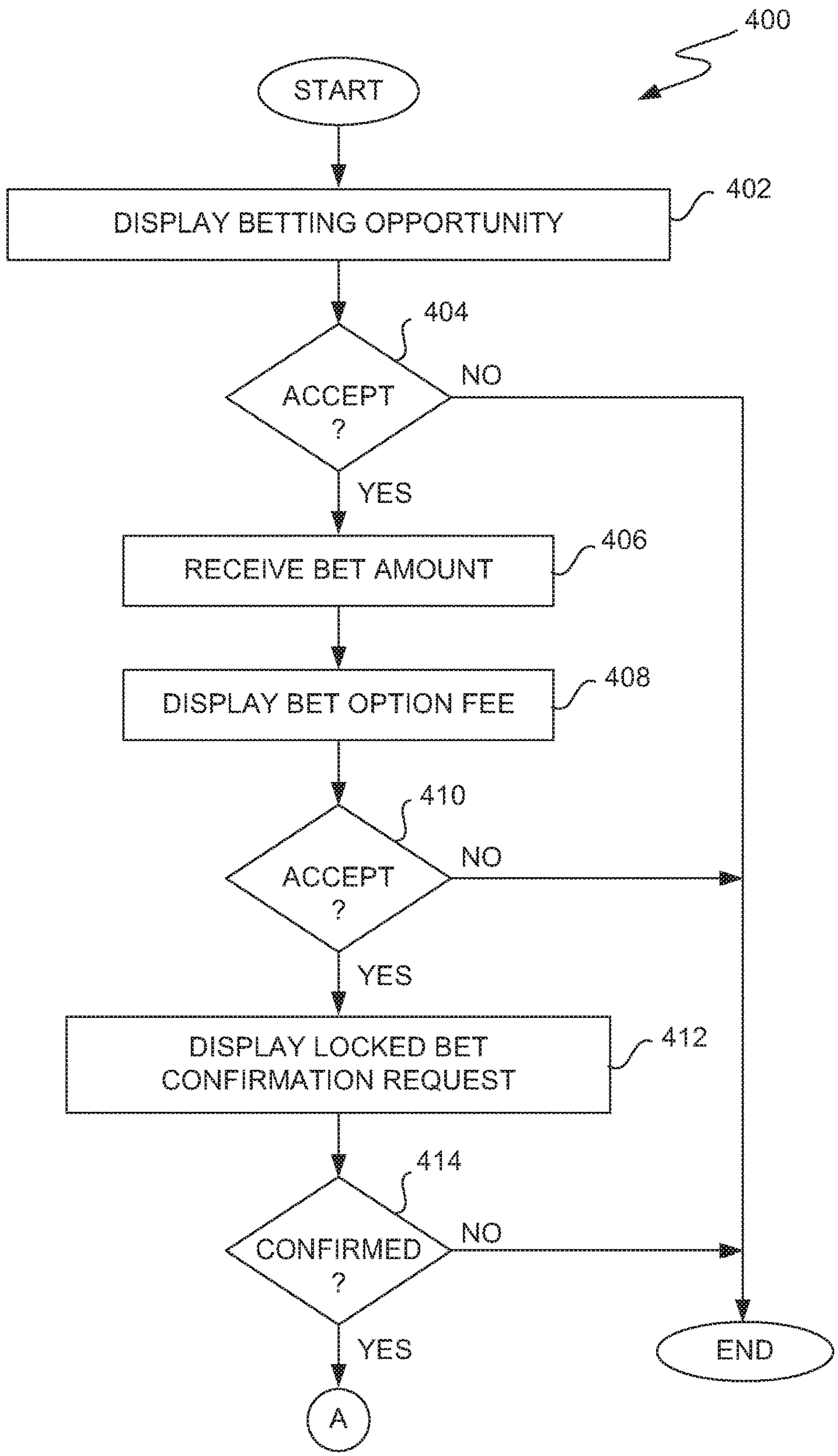
FIGS. 4A and 4B illustrate a flow diagram of a bet locking process according to one embodiment.
Figure 4B:
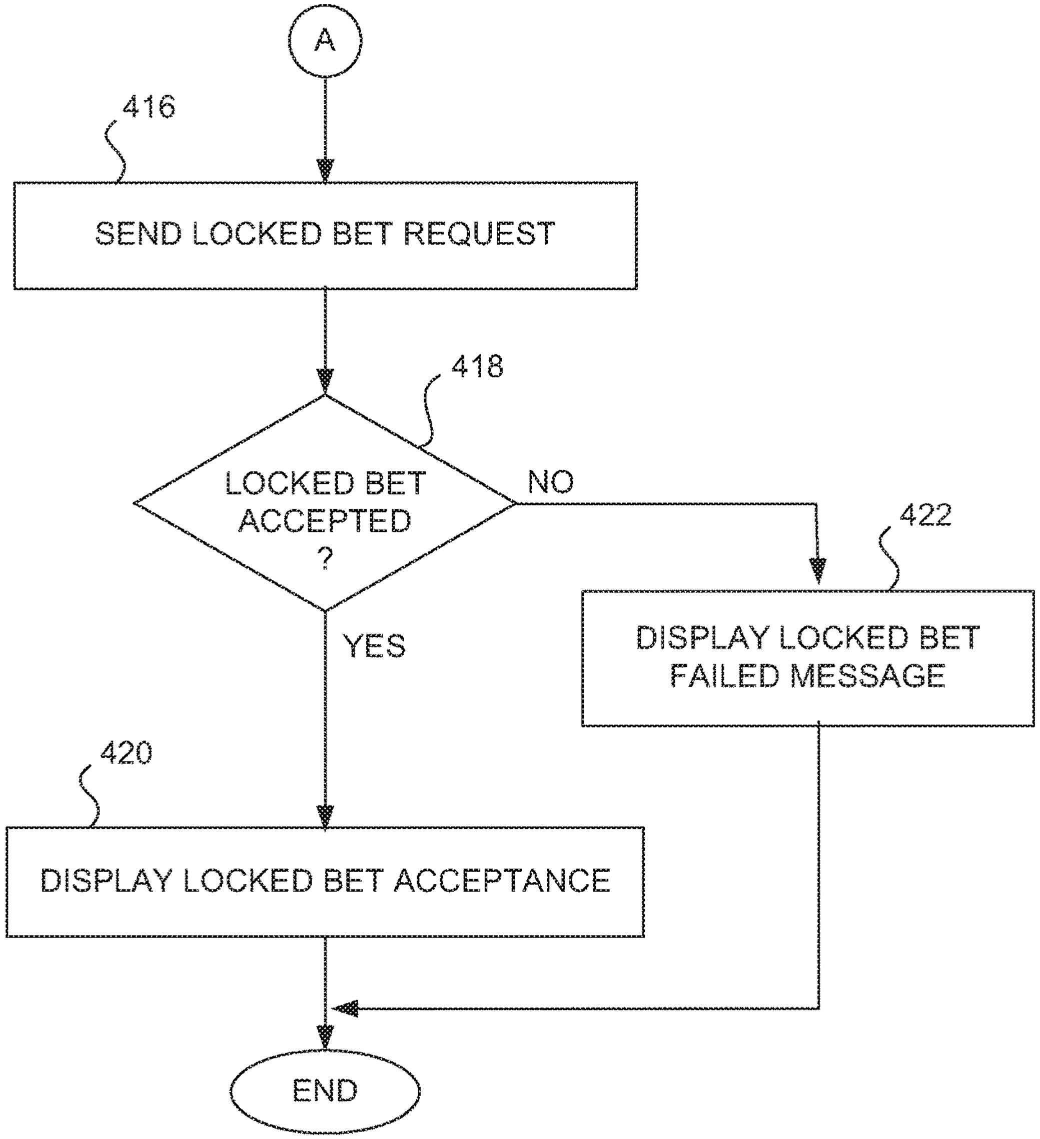

FIGS. 4A and 4B illustrate a flow diagram of a bet locking process 400 according to one embodiment. The bet locking process 400 can be performed by a computing device. The computing device can be a personal computing device, such as a mobile computing device (or portable electronic device).

The bet locking process 400 can display 402 a betting opportunity. Typically, the betting opportunity can be displayed 402 on a display associated with a mobile computing device used by a user. A decision 404 can then determine whether the user has accepted the betting opportunity. Typically, a user can interact with the mobile computing device to indicate their acceptance of the betting opportunity. Alternatively, the user can elect to decline the betting opportunity. If the user has elected to decline the betting opportunity, the bet locking process 400 can end.

However, if the user has elected to accept the betting opportunity, following the decision 404, the bet locking process 400 continues to process the betting opportunity. In this regard, a bet amount can be received 406. For example, the user can interact with the mobile computing device to enter or select a bet amount. Next, a bet option fee can be displayed 408. The bet option fee (or bet lock fee) can represent a fee or charge that is associated with the locking of the betting opportunity. The locked bet opportunity can also be referred to as an option to later activate a bet. In an alternative embodiment, the bet option fee maybe collected without the bet amount received in 406. In this case, the user purchased the right to place the bet later. The bet option must be exercised prior to execution of the game or prior to the presentation of the game result. Otherwise, the bet option expires and becomes worthless. In one example, a user may buy an option to place a $100 bet, at a given odd and pay out schedule. The bet can be premised on any of a variety of betting opportunities. As one example, the bet might be premised on the San Francisco 49ers winning the Super Bowl. As another example, the bet might be premised on the National Lottery's grand prize not having a winner over the next two drawings. If the bet option isn't exercised (e.g., by placing the actual bet at an authorized location) before the cut-off deadline (e.g., before the start of the game, before the next two drawings, etc.), the bet option expires. The bet option fee can be displayed on a display associated with the mobile computing device. A decision 410 can then determine whether the user has accepted the bet option fee. For example, the user can interact with the mobile computing device to indicate their acceptance of the bet option fee. When the decision 410 determines that the user has not accepted, but declined, the bet option fee, the bet locking process 400 can end.

On the other hand, when the decision 410 determines that the user has accepted the bet option fee, a locked bet confirmation request can be displayed 412. The locked bet confirmation request presents information concerning the betting opportunity to be locked. The information concerning the betting opportunity to be locked can be displayed 412 on a display associated with the mobile computing device. The user of the mobile computing device can then evaluate whether the information is correct and whether they want to confirm the locking of the betting opportunity. Next, a decision 414 can determine whether the locked betting opportunity has been confirmed. When the locked betting opportunity has not been confirmed, but denied, the debt locking process 400 can end. Alternatively, when the decision 414 determines that the locked betting opportunity has been confirmed, a locked bet request can be sent 416. Here, the locked bet request can be sent 416, for example, to a remote server computer (e.g., gaming/betting server machine(s) 102) for processing of the locked bet request.

A decision 418 can then determine whether the locked bet has been accepted. Here, in response to the locked bet request, the locked bet being requested can be accepted or decline by a remote processing system, which can operate on the remote server computer. When the decision 418 determines that the locked bet request has been accepted, a locked bet acceptance can be displayed 420. For example, the locked bet acceptance can provide confirmation information that the locked bet being requested has been accepted. The locked bet confirmation can be displayed 420 on a display associated with the mobile computing device. Alternatively, when the decision 418 determines that the locked bet request has not been accepted, but declined, a locked bet failed message can be displayed 422. For example, the locked bet failed message can be displayed 422 on a display associated with the mobile computing device. For example, the locked bet failed message, might indicate failure due to insufficient funds. Following the blocks 420 and 422, the bet locking process 400 can end.

In one embodiment, a database can be used by a server computer to manage availability, acceptance and execution of betting opportunities.

According to another embodiment, an application program in operation, such as on a PED, can provide gaming assets or awards. When transitioning the application program between a gaming authorized mode and a gaming unauthorized mode, such assets or awards can be converted. For example, the conversion can be from currency (e.g., points) to another currency (e.g., cash), or can be converted to functionally-different assets or awards (e.g., game tools, virtual goods) or value-equivalent digital goods (e.g., 2×multiplier bonus for all payouts in the next 10 spins of a slot game, virtual chips).

According to another embodiment, an application program in operation, such as on a PED, can provide games symbols that dynamically change. This creates continuity, as well as progress, that links on-site (authorized gaming location) and off-site (unauthorized gaming location) user experiences. For example, gaming symbols can dynamically change over time, due to game play, due to events, due to location, due to user satisfying participation criteria, etc. For example, a gaming symbol (such as for an award) can initially be an apple seed. Then through continued game play or play time, the apple seed can grow into a tree, and then eventually produce one or more apples. The apples can then be redeemed for benefits which can vary. For example, an apple could be redeemed for a free spin or enhancement (e.g., 2×multiplier) on a game of chance (e.g., slot machine or table wagering game), or for a discounted admission ticket, free extra bonus spin or hotel room upgrade. In one scenario, apple seeds can be acquired at a gaming establishment, which can distribute the apple seeds based on user performance play, random or even virally distributed. Once a user has a seed, the development of the apple tree and the yielding of apples can be facilitated through user actions (e.g., via PED), either at a gaming establishment or while not at a gaming establishment, such as well as at home.

Although betting/wagering can pertain to sports betting, there are various other games that can also offer a betting or wagering opportunity. For example, Keno is a game of change that can involve betting/wagering. For example, an application program can allow users to play a Keno game for "free", but when in a gaming authorized zone, the application program can allow users to play a game of Keno for money. The application program can transform to or from a game mode automatically or only after user permission.

In one embodiment, pre-play can be performed in advance of reaching a gaming authorized area. For example, with pre-play a user can interact with an application program operating on a portable gaming device to schedule (e.g., queue) a bet or wager regardless of their location, and then when the user (and the portable electronic device) reach a gaming authorized area, the application program can initiate auto-play of the scheduled gaming actions. That is, a Bingo player can pre-configure her Bingo card with her "lucky" numbers at home, or a Keno player can preset several lucky number sets (groups of 6 numbers, groups of 7 numbers, etc.) to be activated when the player is at an authorized location for betting, and the like.

In another embodiment, pre-play can be implemented as pre-play lottery using an application to pre-order one or more lottery tickets. The application program can record your request [e.g., specific type, quantity, numbers, etc.]. Later, when the application program is in an "authorization" location (e.g., at an authorized gas station or store) to buy the lottery tickets, the application can initiate the buying of the pre-ordered lottery tickets. The tickets can be e-purchased at an authorized location directly with the application program. Alternatively, the application program can communicate with a point of sale (POS) terminal at the authorized location to make the purchase.

In one embodiment, the application program can also monitor wins and notify the user via the application program, email message or text. The application program can also can keep track of usage history, play and/or performance.

Figure 5:
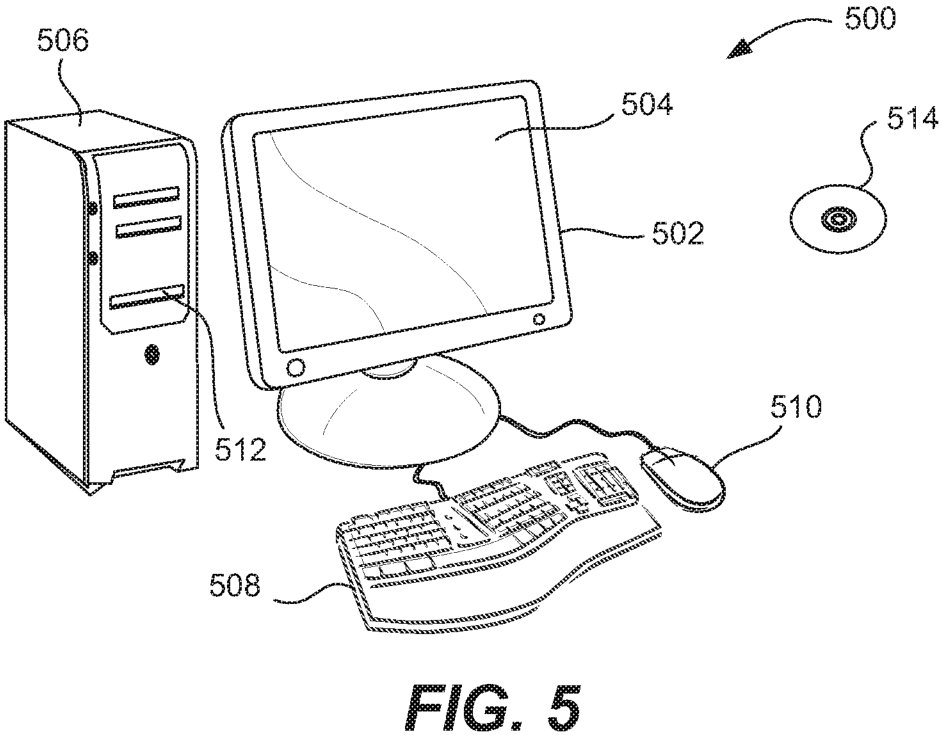
FIG. 5 illustrates an exemplary computer device suitable for use with at least one embodiment of the invention.

FIG. 5 illustrates an exemplary computer device 500 suitable for use with at least one embodiment of the invention. The methods, processes and/or graphical user interfaces discussed above can be provided by a computer device. Although the computing device 500 is depicted as a desktop computer, the computer device 500 can represent computing device of different form factors, such as a server machine or a portable electronic device. The computer device 500 can includes a display monitor 502 having a single or multi-screen display 504 (or multiple displays), a housing 506, a keyboard 508, and a mouse 510. The mouse 510 is representative of one type of pointing device. The housing 506 can house a processing unit (or processor), system memory and a hard drive (not shown). The housing 506 can also house a drive 512, such as a DVD, CD-ROM or floppy drive. The drive 512 can also be a removable hard drive, a Flash or EEPROM device, etc. Regardless, the drive 512 may be utilized to store and retrieve software programs incorporating computer code that implements some or all aspects of the invention, data for use with the invention, and the like. Although CD-ROM 514 is shown as an exemplary computer readable storage medium, other computer readable storage media including floppy disk, tape, Flash or EEPROM memory, memory card, system memory, and hard drive may be utilized. In one implementation, a software program for the computer system 500 is provided in the system memory, the hard drive, the drive 512, the CD-ROM 514 or other computer readable storage medium and serves to incorporate the computer code that implements some or all aspects of the invention.

Figure 6:
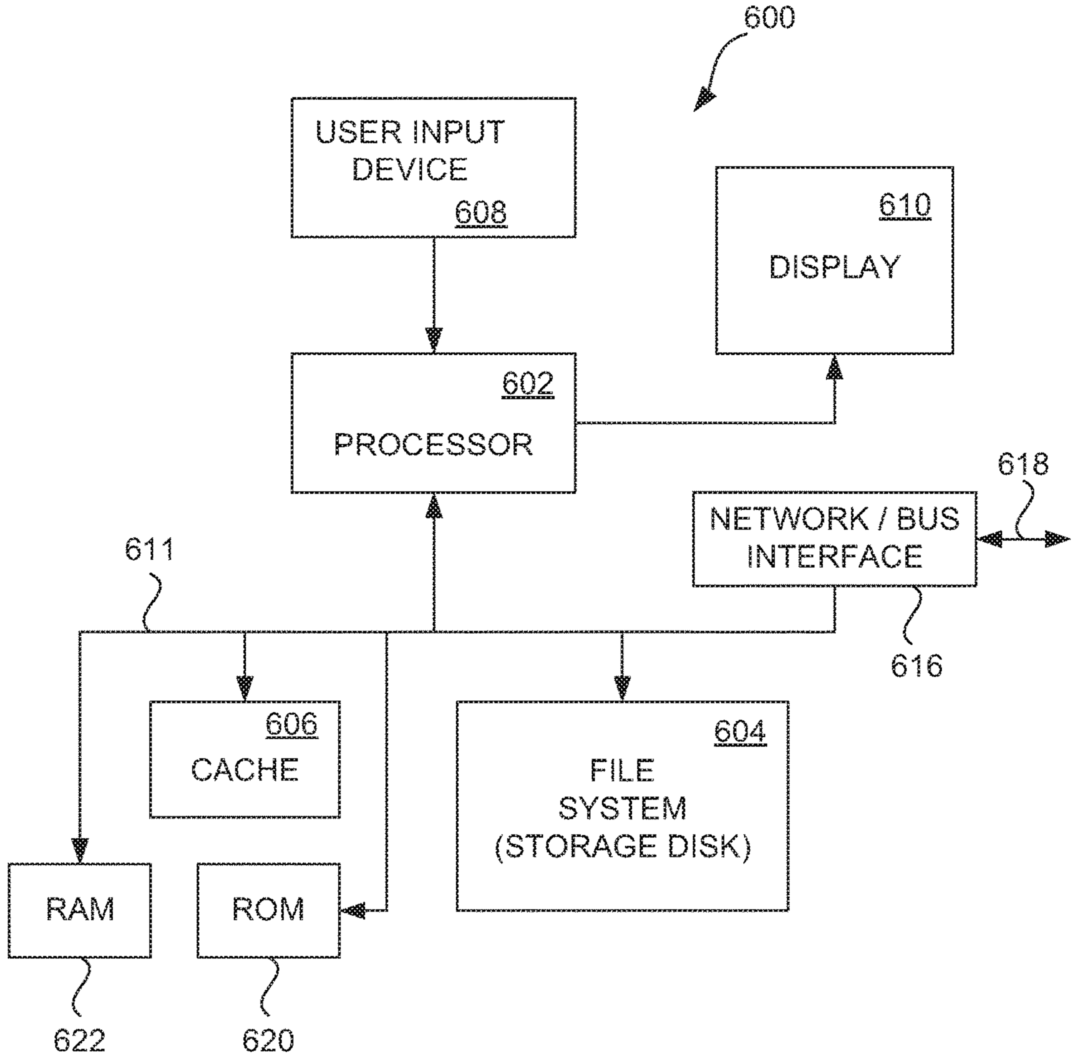
FIG. 6 is a block diagram of an example computing device.

FIG. 6 is a block diagram of an example computing device 600. The computing device 600 can be the gaming/betting server machine(s) 112 or portable electronic devices 106-112 illustrated in FIG. 1, or any other server or computing device used to carry out the various embodiments disclosed herein. The computing device 600 can include a processor 602 that pertains to a microprocessor or controller for controlling the overall operation of the computing device 600. The computing device 600 can store any type of data and information as discussed above in a file system 604 and a cache 606. The file system 604 is, typically, a storage disk or a plurality of disks, and/or solid-state Flash drive. The file system 604 typically provides high capacity storage capability for the computing device 600. However, since the access time to the file system 604 is relatively slow, the computing device 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The computing device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The computing system 600 also includes a user input device 608 that allows a user of the computing system 600 to interact with the computing system 600. For example, the user input device 608 can take a variety of forms, such as a button, keypad, touch screen, dial, and the like. Still further, the computing system 600 includes a display 610 (screen display) that can be controlled by the processor 602 to display information to the user. A data bus 611 can facilitate data transfer between at least the file system 604, the cache 606, the processor 602, and the CODEC 612.

The computing system 600 can also include a network/bus interface 616 that couples to a data link 618. The data link 618 allows the computing system 600 to couple to a host computer or data network, such as the Internet. The data link 618 can be provided over a wired connection or a wireless connection. In the case of a wireless connection, the network/bus interface 616 can include a wireless transceiver.

Additional details on social gaming and the like are provided in U.S. patent application Ser. No. 13/296,182, filed Nov. 14, 2011 and entitled "Social Gaming," which is hereby incorporated herein by reference in its entirety for all purposes.

Additional details on viral events and distribution and the like are provided in U.S. patent application Ser. No. 12/617,717, filed Nov. 12, 2009 and entitled "Gaming System Including A Viral Event," which is hereby incorporated herein by reference in its entirety for all purposes.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A non-transitory computer readable medium including at least computer program code for an application program stored thereon, the application program being executable by a computing device, said non-transitory computer readable medium comprising:

computer program code for causing presentment of a betting opportunity via the application program, the betting opportunity pertaining to an available wager having characteristics that may change over time;

computer program code for initiating locking in the betting opportunity for future execution for a user of the computing device, when it is determined that the user of the application program desires to pursue the betting opportunity, the locking in the betting opportunity preserves the betting opportunity for the user but does not place a bet based on the betting opportunity such that the user can later make the available wager with its characteristics as existed when the betting opportunity was locked even though the characteristics of the available wager may have since changed;

computer program code for determining whether the betting opportunity that has been locked has expired; and computer program code for ending the betting opportunity that has been locked after the computer program code for determining determines that the betting opportunity that has been locked has expired.

2. A non-transitory computer readable medium as recited in claim 1, wherein said non-transitory computer readable medium comprises:

computer program code for determining whether the computing device is in a gaming authorized location at least after the betting opportunity has been locked in.

3. A non-transitory computer readable medium as recited in claim 2, wherein said non-transitory computer readable medium comprises:

computer program code for displaying a betting activation confirmation if the location of the computing device is located in a gaming authorized location and the betting opportunity that has been locked has not expired; and computer program code for determining whether a betting confirmation has been received in response to the betting activation confirmation.

4. A non-transitory computer readable medium as recited in claim 3, wherein said non-transitory computer readable medium comprises:

computer program code for initiating execution of a bet corresponding to the betting opportunity for the user of the computing device if it is determined that the betting confirmation has been received and if the location of the computing device is located in a gaming authorized location, the initiating execution of the bet operates cause the bet to be placed.

5. A non-transitory computer readable medium as recited in claim 1, wherein the computing device is a portable electronic device, and wherein said non-transitory computer readable medium comprises:

computer program code for displaying a betting opportunity to the user via the portable electronic device associated with the user; and computer program code for receiving, using the portable electronic device, a bet amount for the betting opportunity.

6. A non-transitory computer readable medium as recited in claim 5, wherein said non-transitory computer readable medium comprises:

computer program code for initiating locking of the bet amount for the betting opportunity to make the bet amount for the user.

7. A non-transitory computer readable medium as recited in claim 1, wherein the computing device is a portable electronic device, and wherein said non-transitory computer readable medium comprises:

computer program code for displaying a bet option fee for locking in one or more of bet options corresponding to the betting opportunity;

computer program code for receiving an acceptance of the bet option fee; and computer program code for subsequently initiating locking of the one or more bet options.

8. A non-transitory computer readable medium as recited in claim 7, wherein said non-transitory computer readable medium comprises:

computer program code for initiating activation of a bet corresponding to the one or more bet options that have been locked once the determining determines that the portable electronic device is in a gaming authorized location.

9. A non-transitory computer readable medium as recited in claim 7, wherein the one or more bet options have one or more expiration times, respectively.

10. A non-transitory computer readable medium as recited in claim 1, wherein the computing device is a portable electronic device, and wherein said non-transitory computer readable medium comprises:

computer program code for periodically determining whether the portable electronic device is in a gaming authorized location; and computer program code for initiating activation of a bet corresponding to the betting opportunity that has been locked once the determining determines that the portable electronic device is in a gaming authorized location, so long as the bet opportunity has not expired.

11. A non-transitory computer readable medium as recited in claim 10, wherein the gaming authorized location correlates to an establishment location, and wherein the computing device is a smart phone or a tablet computer.

12. A method for facilitating deferred betting, said method comprising:

causing presentment of a betting opportunity via an application program operating on a computing device, the betting opportunity pertaining to an available wager having characteristics that may change over time;

initiating locking in the betting opportunity for future execution for a user of the computing device, when it is determined that the user of the application program desires to pursue the betting opportunity, the locking in the betting opportunity preserves the betting opportunity for the user but does not place a bet based on the betting opportunity such that the user can later make the available wager with its characteristics as existed when the betting opportunity was locked even though the characteristics of the available wager may have since changed;

determining whether the betting opportunity that has been locked has expired; and ending the betting opportunity that has been locked after the determining determines that the betting opportunity that has been locked has expired.

13. A method as recited in claim 12, wherein said method comprises:

determining whether the computing device is in a gaming authorized location at least after the betting opportunity has been locked in.

14. A method as recited in claim 13, wherein said method comprises:

displaying a betting activation confirmation if the location of the computing device is located in a gaming authorized location and the betting opportunity that has been locked has not expired; and determining whether a betting confirmation has been received in response to the betting activation confirmation.

15. A method as recited in claim 14, wherein said method comprises:

initiating execution of a bet corresponding to the betting opportunity for the user of the computing device if it is determined that the betting confirmation has been received and if the location of the computing device is located in a gaming authorized location, the initiating execution of the bet operates cause the bet to be placed.

16. A method as recited in claim 12, wherein the computing device is a portable electronic device, and wherein said method comprises:

displaying a betting opportunity to the user via the portable electronic device associated with the user; and receiving, using the portable electronic device, a bet amount for the betting opportunity.

17. A method as recited in claim 16, wherein said method comprises:

initiating locking of the bet amount for the betting opportunity to make the bet amount for the user.

18. A method as recited in claim 12, wherein the computing device is a portable electronic device, and wherein said method comprises:

displaying a bet option fee for locking in the betting opportunity;

receiving an acceptance of the bet option fee; and subsequently permitting the initiating of the locking of the betting opportunity for the benefit of the user.

19. A method as recited in claim 18, wherein said method comprises:

initiating activation of a bet corresponding to the betting opportunity that has been locked once the determining determines that the portable electronic device is in a gaming authorized location.

20. A method as recited in claim 18, wherein the betting opportunity that has been locked has an expiration time, and said non-transitory computer readable medium comprises:

closing the betting opportunity that has been locked after the expiration time.

21. A method as recited in claim 12, wherein the computing device is a portable electronic device, and wherein said method comprises:

periodically determining whether the portable electronic device is in a gaming authorized location; and initiating activation of a bet corresponding to the betting opportunity that has been locked once the determining determines that the portable electronic device is in a gaming authorized location, so long as the bet opportunity has not expired.

22. A method as recited in claim 21, wherein the gaming authorized location is a state wide location.

23. A method as recited in claim 21, wherein the gaming authorized location is an establishment wide location.

24. A method as recited in claim 21, wherein the gaming authorized location is limited to an internal area within a gaming establishment.

25. A method as recited in claim 12, wherein the computing device is a smart phone or a tablet computer.

* * * * *